(12) United States Patent
DiChiara, Jr. et al.

(10) Patent No.: US 10,330,136 B2
(45) Date of Patent: Jun. 25, 2019

(54) ANTI-ROTATIONAL FASTENER SYSTEM

(71) Applicant: The Boeing Company, Chicago, IL (US)

(72) Inventors: Robert A. DiChiara, Jr., Carlsbad, CA (US); Keith A. Etling, Shiloh, IL (US); David S. Blum, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 15/350,366

(22) Filed: Nov. 14, 2016

(65) Prior Publication Data
US 2018/0135679 A1    May 17, 2018

(51) Int. Cl.
| | | |
|---|---|---|
| *F16B 39/10* | (2006.01) | |
| *F16B 13/08* | (2006.01) | |
| *B25B 15/00* | (2006.01) | |
| *B25B 31/00* | (2006.01) | |
| *F16B 39/22* | (2006.01) | |
| *B25B 23/00* | (2006.01) | |

(52) U.S. Cl.
CPC ........ *F16B 13/0808* (2013.01); *B25B 15/004* (2013.01); *B25B 31/00* (2013.01); *F16B 39/10* (2013.01); *F16B 39/22* (2013.01); *B25B 23/0085* (2013.01)

(58) Field of Classification Search
CPC ........ F16B 30/10; F16B 35/00; F16B 37/044; F16B 39/10
USPC ................ 411/321, 322, 204, 216, 221, 326, 411/111–113, 395; 285/92
See application file for complete search history.

(56) References Cited

U.S. PATENT DOCUMENTS

| | | | |
|---|---|---|---|
| 738,060 A * | 9/1903 | Parsons | F16B 39/10 411/190 |
| 828,019 A | 8/1906 | Cronin | |
| 842,450 A * | 1/1907 | Ennis | F16B 39/10 400/556.1 |
| 1,022,336 A * | 4/1912 | Shaw | F16B 39/10 411/190 |
| 1,201,464 A | 10/1916 | Hebert | |
| 2,335,828 A * | 11/1943 | Herget | F16B 5/0208 411/322 |
| 2,913,031 A | 11/1959 | McKay et al. | |
| 2,976,901 A * | 3/1961 | Heyworth | F16B 5/0208 411/105 |

(Continued)

FOREIGN PATENT DOCUMENTS

| | | |
|---|---|---|
| DE | 34 10 872 | 10/1985 |
| GB | 01231 | 4/1912 |

OTHER PUBLICATIONS

European Patent Office, "Extended European Search Report," App. No. 17191131.6 (dated Mar. 27, 2018).

*Primary Examiner* — Flemming Saether
(74) *Attorney, Agent, or Firm* — Walters & Wasylyna LLC

(57) ABSTRACT

A fastener system includes a fastener including a fastener first end and a longitudinally opposed fastener second end, and an anchor configured to receive and capture the fastener upon rotation of the fastener in a first direction, wherein the anchor is further configured to engage the fastener first end upon complete rotation of the fastener in the first direction, and the anchor is further configured to prohibit further rotation in a second direction, opposite the first direction, upon engagement with the fastener first end.

20 Claims, 11 Drawing Sheets

(56) References Cited

U.S. PATENT DOCUMENTS

| | | | | |
|---|---|---|---|---|
| 3,404,716 | A | * | 10/1968 | Cosenza ............... F16B 5/0208 411/105 |
| 4,191,236 | A | * | 3/1980 | Duran ..................... F16B 39/10 411/105 |
| 4,863,326 | A | * | 9/1989 | Vickers ................ F16B 5/0266 411/105 |
| 5,082,406 | A | * | 1/1992 | Cosenza ............... F16B 5/0208 403/408.1 |
| 5,244,326 | A | * | 9/1993 | Henriksen ............. F16B 37/145 411/180 |
| 5,403,043 | A | * | 4/1995 | Smet ................... F16L 37/2445 285/148.21 |
| 5,511,941 | A | * | 4/1996 | Brandon ............... F01D 25/243 411/395 |
| 7,204,668 | B2 | | 4/2007 | Le |
| 7,445,413 | B2 | * | 11/2008 | Niederhageboeck ... B25B 13/48 411/216 |
| 7,823,262 | B2 | * | 11/2010 | Toosky ................ F16B 37/044 29/402.03 |
| 8,777,193 | B2 | | 7/2014 | Loret de Mola |
| 2017/0114819 | A1 | | 4/2017 | DiChiara |
| 2017/0114821 | A1 | | 4/2017 | DiChiara |
| 2017/0117621 | A1 | | 4/2017 | DiChiara |

* cited by examiner

ANTI-ROTATIONAL FASTENER SYSTEM

FIELD

The present disclosure is generally related to fasteners and, more particularly, to a fastener system having an anti-rotation feature for fastening structure members together and, still more particularly, to a high temperature anti-rotational fastener system.

BACKGROUND

Mechanical fastener systems, such as bolt and nut fasteners, are commonly used to connect components of a structure together. However, in many structures, access to the fastener system is limited to only one side (e.g., the exterior) of the structure. In response to this problem, the nut may be fixed in its fastened position prior to installation and tightening of the bolt.

Further, the effects of vibration and thermal expansion transmitted to the fastener system can lead to loosening of the fastener system (e.g., the bolt counter-rotating and loosening itself from the nut). The effects from vibrations and thermal expansion on fastener systems may be particularly problematic in the aerospace industry. In response to this problem, the fastener system also includes a wire attached to the bolt, where the tension in the wire prevents the bolt from rotating. However, these anti-rotation devices can negatively impact the aerodynamics of the outer surface of the structure, which may be particularly problematic in the aerospace industry. There is therefore a need for a mechanical fastener system having an anti-rotational feature that minimizes the effect on the aerodynamic efficiency of the exterior surface of a structure.

Moreover, in many applications, particularly in the aerospace industry, the exterior of the structure may be exposed to or experience very high temperatures. As examples, the exterior surfaces of atmospheric reentry vehicles, hypersonic vehicles and internal jet engine exhaust components may get extremely hot during operation. In response to this problem, the exterior surfaces of the structure are typically covered with a Thermal Protection System (TPS) such as ceramic tiles, panels, blankets, ceramic matrix composites or actively cooled liners. Such thermal coverings are typically bonded to the surface of the structure, for example, over any fasteners used to connect the structure, with high temperature adhesives. However, removal of these thermal coverings for repair or replacement is labor intensive and costly. There is therefore a need for a mechanical fastener system to mechanically attach thermal coverings and that is capable of withstanding high temperatures.

Accordingly, those skilled in the art continue with research and development efforts in the field of fastener systems.

SUMMARY

In one embodiment, the disclosed fastener system includes a fastener including a fastener first end and a longitudinally opposed fastener second end, and an anchor configured to receive and capture the fastener upon rotation of the fastener in a first direction, wherein the anchor is further configured to engage the fastener first end upon complete rotation of the fastener in the first direction, and the anchor is further configured to prohibit further rotation in a second direction, opposite the first direction, upon engagement with the fastener first end.

In another embodiment, the disclosed structure includes a first structure member including a first fastener aperture, a second structure member including a second fastener aperture, wherein the second structure member abuts the first structure member and the second fastener aperture is aligned with the first fastener aperture, an anchor fixed within the first fastener aperture, a fastener inserted through the second fastener aperture and captured by the anchor, wherein the anchor engages the fastener first end upon complete rotation of the fastener in a first direction, and the anchor prohibits further rotation in a second direction, opposite the first direction, upon engagement with the fastener first end.

In yet another embodiment, the disclosed method for fastening a first structure member having a first fastener aperture to a second structure member having a second fastener aperture includes the steps of: (1) fixing an anchor within the first fastener aperture, (2) abutting the first structure member and the second structure member with the first fastener aperture aligned with the second fastener aperture, (3) inserting a fastener through the second fastener aperture, (4) receiving the fastener within the anchor, (5) rotating the fastener in a first direction, (6) capturing the fastener with the anchor, (7) engaging a fastener first end of the fastener with the anchor upon complete rotation of the fastener in the first direction, and (8) prohibiting further rotation of the fastener in a second direction, opposite the first direction, with the anchor upon engagement of the anchor with the fastener first end.

Other embodiments of the disclosed apparatus and method will become apparent from the following detailed description, the accompanying drawings and the appended claims.

DETAILED DESCRIPTION

Figure 1:
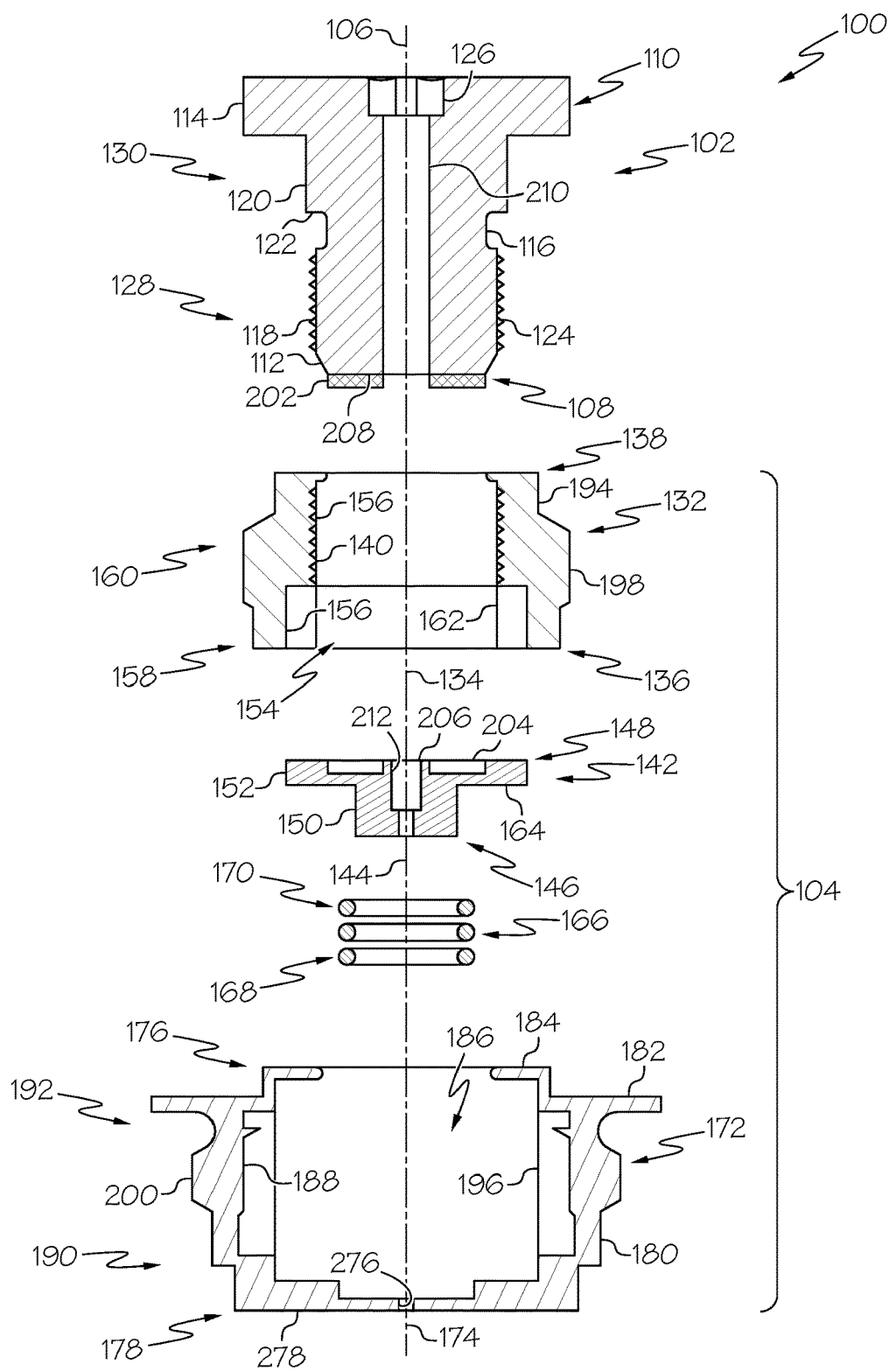
FIG. 1 is a schematic exploded elevation view, in section, of an embodiment of the disclosed fastener system.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

FIG. 1 is a schematic elevation view, in section, of an exemplary embodiment of the disclosed fastener system 100. The fastener system 100 includes a fastener 102 and an anchor 104, or anchor assembly. The anchor 104 is configured to at least partially receive and capture the fastener 102. The anchor 104 is further configured to prevent rotation of fastener 102 in at least one direction.

The fastener 102 includes a fastener center axis 106, also referred to as a fastener longitudinal axis and/or a fastener axis of rotation. The fastener 102 includes a fastener first end 108 and a fastener second end 110 longitudinally opposed to the fastener first end 108. The fastener 102 includes a nose 112 disposed as the fastener first end 108, i.e., the fastener first end 108 may terminate in the nose 112. The fastener 102 includes a fastener head 114 disposed at the fastener second end 110.

Figure 3:
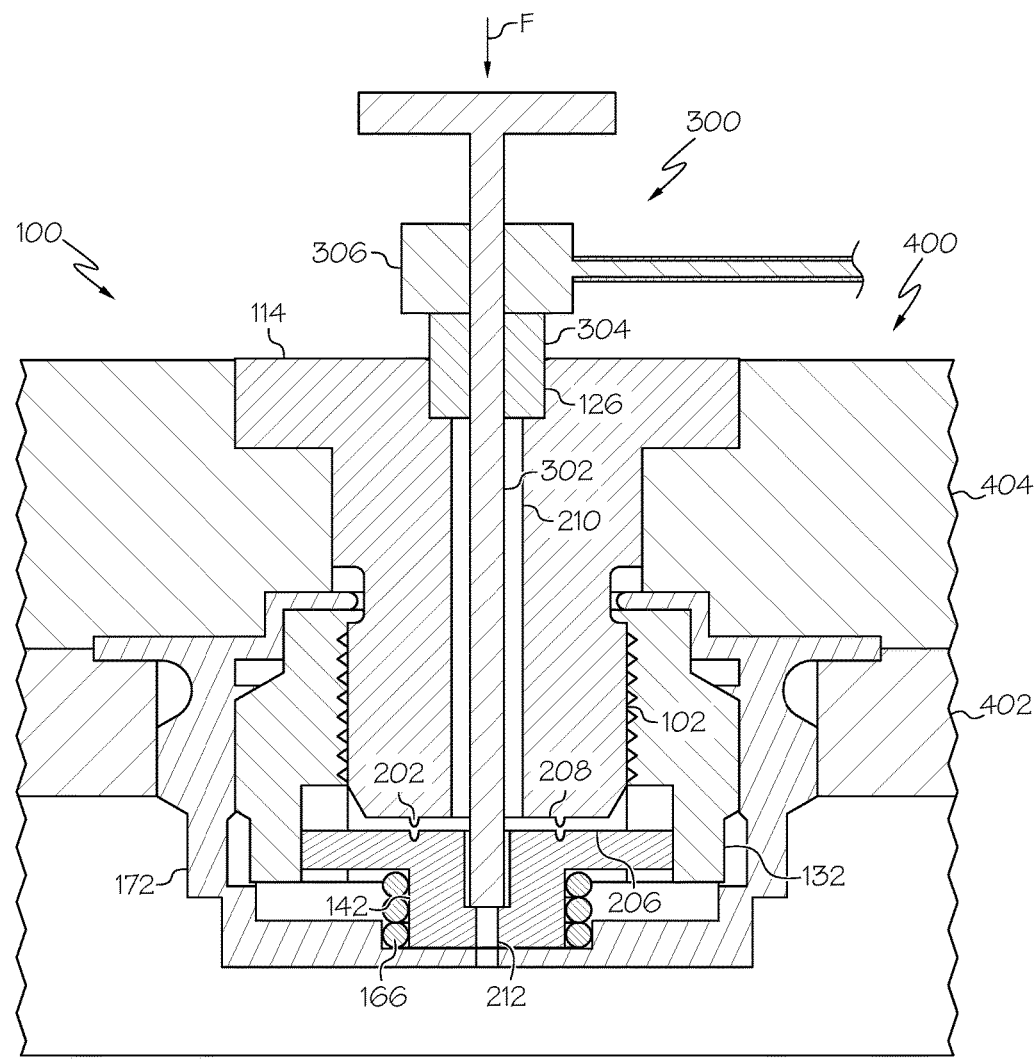
FIG. 3 is another schematic elevation view, in section, of the disclosed fastener system installed on the structure.

The fastener head 114 may include a socket 126. The socket 126 may be configured for engagement by a suitable tool 300 (FIG. 3). As an example, the socket 126 may be a star, also known as Torx®, socket configured for engagement by a Torx® driver or bit. As another example, the socket 126 may be a hexagonal, also known as an Allen, socket configured for engagement with an Allen wrench or bit. Any number of other different socket configurations for engagement by a corresponding tool are also contemplated, such as a square socket, a Phillips socket, a Frearson socket, a slotted socket, a combination socket and the like.

The fastener 102 includes a shank 116, or shaft, extending from the fastener first end 108 (e.g., proximate the nose 112) to the fastener second end 110 (e.g., proximate the fastener head 114). In an example embodiment, the shank 116 includes a first outer diameter 118 and a second outer diameter 120. In an example, the first outer diameter 118 is less than the second outer diameter 120 forming or defining a shoulder 122. At least a portion of the shank 116 includes external male threads 124. As an example, a first portion 128 of the shank 116, for example, having the first outer diameter 118, may include the male threads 124. In this example, a second portion 130 of the shank 116, for example, having the second outer diameter 120, may include a smooth surface.

Figure 2:
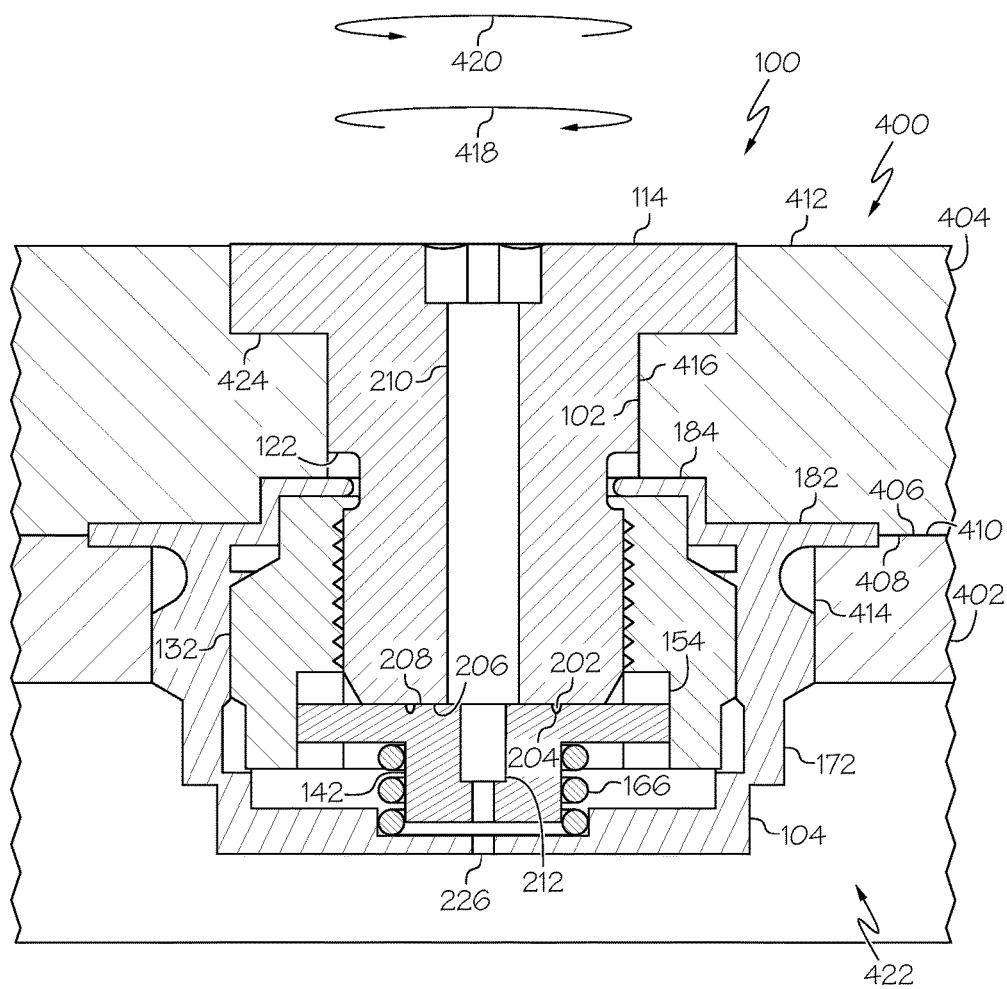
FIG. 2 is a schematic elevation view, in section, of an embodiment of the disclosed fastener system installed on a structure.

Accordingly, in an exemplary embodiment of the fastener system 100, the anchor 104 configured to receive and capture the fastener 102 upon rotation of the fastener in the first direction 418 (FIG. 2). The anchor is further configured to engage the fastener first end 108 upon complete rotation of the fastener 102 in the first direction 418. The anchor 104 is further configured to prohibit further rotation of the fastener 102 in a second (e.g., counter rotation) direction 420 (FIG. 2), opposite the first direction 418, upon engagement with the fastener first end 108. In certain embodiments, the anchor 104 is further configured to prohibit further rotation of the fastener 102 in the first direction 418 upon engagement with the fastener first end 108. In certain other embodiments, the anchor 104 is further configured to permit further rotation of the fastener 102 in the first direction 418 upon engagement with the fastener first end 108.

The anchor 104 includes a nut 132. The nut 132 is configured to receive and capture a portion of the fastener 102. The nut 132 includes a nut center axis 134, also referred to as a nut longitudinal axis or nut axis of rotation. The nut 132 also includes a nut first end 136 and a nut second end 138 longitudinally opposed to the nut first end 136. The nut 132 also includes internal female threads 140 configured to mate with and engage the male threads 124 of the fastener 102. As an example, at least a portion of an internal sidewall 156 of nut 132 includes the female threads 140.

In an example embodiment, the male threads 124 of the fastener 102 and the female threads 140 of the nut 132 utilize a UNJF type thread design (compared to a typical UNF or UNC thread design). This thread design may minimize the notch sensitivity of the threads, particularly when the fastener 102 and/or the nut 132 are made of a ceramic or metal, and improve both strength and fatigue of the fastener system 100.

The anchor 104 also includes anti-rotation lock plate 142. The lock plate 142 is configured to engage the nose 112 of the fastener 102 and prevent rotation of the fastener 102, about the fastener center axis 106, in at least one direction upon engagement. The lock plate 142 includes a lock plate center axis 144, also referred to as a lock plate longitudinal axis or lock plate axis of rotation. The lock plate 142 also includes a lock plate first end 146 and a lock plate second end 148 longitudinally opposed to the lock plate first end 146. In an example embodiment, the lock plate 142 includes a stem 150 disposed at the lock plate first end 146 and a lock plate head 152 disposed at the lock plate second end 148.

The nut 132 also includes a nut recess 154 formed or defined by the internal sidewall 156 of the nut 132. The nut recess 154 is configured to receive at least a portion of the lock plate 142, for example, the lock plate head 152. The nut recess 154 is also configured to prevent rotation of the lock plate 142, about the lock plate center axis 144.

In an example embodiment, the internal sidewall 156 of the first portion 158 of the nut 132 is configured to engage at least a portion of the lock plate 142 to fix the rotational position of the lock plate 142 and prevent rotation. As an example, the internal sidewall 156 of a first portion 158 of the nut 132, defining the nut recess 154, may include a shape matching the perimeter shape of the lock plate head 152 such that, upon the lock plate head 152 being received within the nut recess 154, rotation of the lock plate 142 is prohibited. The internal sidewall 156 of the first portion 158 of the nut 132 may include a smooth surface to allow linear movement of the lock plate 142, along the nut center axis 134. In this example, the internal sidewall 156 of a second portion 160 of the nut 132 may include the female threads 140.

In another example embodiment, and as illustrated in FIG. 1, the internal sidewall 156 of the first portion 158 of the nut 132 may include at least one nut groove 162 (two nut grooves 162 are shown by example). In this example embodiment, the lock plate 142 may include at least one lock plate tongue 164 (two lock plate tongues 164 are shown by example) extending radially outward from the lock plate head 152. The nut groove 162 is configured to receive an associated lock plate tongue 164, upon the lock plate head 152 being received within the nut recess 154, to prohibit rotation of the lock plate 142 within the nut recess 154.

The anchor 104 also includes a biasing element 166. The biasing element 166 is configured to bias the lock plate 142 into a position within the nut recess 154 for engagement with the nose 112 of the fastener 102. The biasing element 166 includes a biasing element first end 168 and a biasing element second end 170 longitudinally opposed to the biasing element first end 168. As an example, the biasing element 166 is a coil spring.

In an exemplary embodiment, the biasing element 166 is configured to bias the lock plate 142 into interlocking engagement with the fastener first end 108. The lock plate 142 is configured to prohibit further rotation (e.g., counter rotation) of the fastener 102 in the second direction 420 (FIG. 2) upon interlocking engagement of the lock plate 142 with the fastener first end 108. The biasing element 166 is further configured to bias the lock plate 142 into contact engagement with the fastener first end 108 upon complete rotation of the fastener 102 in the first direction 418 (FIG. 2) and further bias the lock plate 142 into interlocking engagement with the fastener first end 108 upon contact engagement of the lock plate 142 with the fastener first end 108 and partial rotation of the fastener 102 in the first direction 418 or the second direction 420. In an example, the lock plate 142 is further configured to limit partial rotation of the fastener 102 to no more than one-quarter (¼) of one rotation in the first direction 418 or the second direction 420 upon contact engagement with the fastener first end 108. In another example, the lock plate 142 is further configured to limit partial rotation of the fastener 102 to no more than one-eighth (⅛) of one rotation in the first direction 418 or the second direction 420 upon contact engagement with the fastener first end 108.

The anchor 104 also includes a nut plate 172. The nut plate 172 is configured to receive the nut 132 and prevent rotation of the nut 132, about the nut center axis 134. The nut plate 172 includes a nut plate center axis 174. The nut plate 172 also includes a nut plate first end 176 and a nut plate second end 178 longitudinally opposed to the nut plate first end 176.

The nut plate 172 includes a tubular portion 180. The nut plate 172 also includes a flange 182 extending radially outward from the tubular portion 180 proximate the nut plate second end 178. As an example, the flange 182 may be used to connect the nut plate 172 to a structure member. The nut plate 172 also includes a bracket 184 extending radially inward from the tubular portion 180 proximate the nut plate second end 178. The bracket 184 may extend over the nut second end 138 to encapsulate the nut 132 within the nut plate 172. As an example, the bracket 184 may be a portion of the body of the nut plate 172 proximate the nut plate first end 176 formed over the nut 132 once located within the nut plate 172. As another example, the bracket 184 may be a separate element, such as a locking ring, connected to the nut plate first end 176 of the nut plate 172 over the nut 132 once located within the nut plate 172.

The nut plate 172 also includes a nut plate receptacle 186 formed or defined by an internal sidewall 188 of the tubular portion 180 of the nut plate 172. The nut plate receptacle 186 is configured to receive the nut 132 and prevent rotation of the nut 132, about the nut center axis 134. The nut plate receptacle 186 is also configured to receive the lock plate 142 and the biasing element 166 and allow linear movement of the lock plate 142, along the nut plate center axis 174.

In an example embodiment, the internal sidewall 188 of a first portion 190 of the nut plate 172, partially defining the nut plate receptacle 186, is configured to accommodate the biasing element 166 and the lock plate 142. As an example, the biasing element first end 168 is connected or otherwise secured to a bottom wall 278 of the tubular portion 180 of the nut plate 172 at the nut plate first end 176. The biasing element second end 170 is connected or otherwise secured to the stem 150 of the lock plate 142 at the lock plate first end 146. The internal sidewall 188 of a second portion 192 of the nut plate 172 is configured to engage at least a portion of the nut 132 to fix the rotational portion of the nut 132 and prevent rotation. As an example, the internal sidewall 188 of the second portion 192 of the nut plate 172, partially defining the nut plate receptacle 186, may include a shape matching the perimeter shape of an external sidewall 194 of the nut 132 such that rotation of the nut 132 is prohibited.

In another example embodiment, and as illustrated in FIG. 1, the internal sidewall 188 of the second portion 192 of the tubular portion 180 of the nut plate 172 may include at least one nut plate groove 196 (two nut plate grooves 196 are shown by example). In this example embodiment, the nut 132 may include at least one nut tongue 198 (two nut tongues 198 are shown by example) extending radially outward from the external sidewall 194 of the nut 132. The nut plate groove 196 is configured to receive an associated nut tongue 198 to prohibit rotation of the nut 132 within the nut plate receptacle 186.

The fastener 102 also includes a fastener locking feature 202 disposed on the fastener first end 108. The lock plate 142 also includes a lock plate locking feature 204 disposed at the lock plate second end 148. The fastener locking feature 202 and the lock plate locking feature 204 engage each other and cooperatively mate and interlock to prevent rotation of the fastener 102. As will be described in more detail herein below, the fastener locking feature 202 may protrude from or be recessed within a fastener engagement surface 208 of the nose 112 of the fastener 102. Similarly, the lock plate locking feature 204 may correspondingly be recessed within or protrude from a lock plate engagement surface 206 of the lock plate head 152 of the lock plate 142.

In an exemplary embodiment, the fastener first end includes the fastener engagement surface 208 and the fastener locking feature 202 disposed on the fastener engagement surface 208. The lock plate 142 includes the lock plate engagement surface 206 and the lock plate locking feature 204 disposed on the lock plate engagement surface 206. The fastener locking feature 202 aligns with the lock plate locking feature 204 upon further rotation of the fastener 102 in the first direction 418 or the second direction 420 (FIG. 2). The lock plate locking feature 204 mates with the fastener locking feature 202 upon interlocking engagement of the lock plate 142 with the fastener first end 108.

In an example embodiment, the fastener 102 also includes a fastener channel 210 extending from the fastener first end 108 to the fastener second end 110. As an example, the fastener channel 210 is formed circumferentially about the fastener center axis 106 and extends through the nose 112, the shank 116 and the fastener head 114 of the fastener 102. As will be described in more detail herein below, the fastener channel 210 provides access to the lock plate 142 though the fastener 102 to disengage the lock plate locking feature 204 of the lock plate 142 from the fastener locking feature 202 of the fastener 102. Further, the fastener channel 210 may accommodate a flow of cooling air to cool the fastener 102.

In this embodiment, the lock plate 142 also includes a lock plate channel 212 extending from the lock plate first end 146 to the lock plate second end 148. As an example, the lock plate channel 212 is formed circumferentially about the lock plate center axis 144 and extends through the stem 150 and the lock plate head 152 of the lock plate 142. As will be described in more detail herein below, the lock plate channel 212 may accommodate the flow of cooling air to cool the lock plate 142, the nut 132 and/or the fastener 102.

In this embodiment, the nut plate 172 also includes a nut plate channel 276 extending though the bottom wall 278 of the tubular portion 180 of the nut plate 172. As an example, the nut plate channel 276 is formed circumferentially about the nut plate center axis 174. As will be described in more detail herein below, the nut plate channel 276 may accommodate the flow of cooling air to cool the lock plate 142, the nut 132 and/or the fastener 102.

FIG. 2 is schematic elevation view, in section, of an exemplary embodiment of the disclosed fastener system 100. FIG. 2 illustrates the fastener system 100 installed on a structure 400 with interlocking engagement of the fastener engagement surface 208 (i.e., the fastener locking feature 202) of the fastener 102 and the lock plate engagement surface 206 (i.e., the lock plate locking feature 204) of the lock plate 142.

Generally, the structure 400 includes a first structure member 402 and a second structure member 404. The first structure member 402 and the second structure member 404 are joined together in an abutting relationship at a surface interface 406. The first structure member 402 includes a first interface surface 408. As an example, the first interface surface 408 may be an outer surface of the first structure member 402. The second structure member 404 includes a second interface surface 410. As an example, the second interface surface 410 may be an inner surface of the second structure member 404. The second structure member 404 may also includes an opposed surface 412. As an example, the opposed surface 412 may be an outer surface of the second structure member 404. The first interface surface 408 and the second interface surface 410 are placed in an abutting relationship for installation of the fastener system 100.

In an example implementation, the structure 400 may be an aerospace vehicle, such as an aircraft, a spacecraft, an atmospheric reentry vehicle and the like. In this example, the first structure member 402 may be an airframe or other underlying support frame of the vehicle, for example, made of a metal or polymer matrix composite. The second structure member 404 may be a panel, such as a skinned ceramic matrix composite (CMC) panel or a thermal protection system (TPS), defining an exterior surface of the aerospace vehicle.

In another example implementation, the structure 400 may be an engine cowling for covering an engine, such as a jet engine found on an aircraft. In this example, the first structure member 402 may be the underlying support frame of the cowling, for example, made of titanium or Inconel (e.g., a family of austenite nickel-chromium-based superalloys). The second structure member 404 may be a panel, such as a skinned CMC panel or other TPS panel, defining an interior surface of the cowling.

In yet other examples, the structure 400 may be various other types of vehicles (e.g., land vehicle, marine vehicle, etc.) or other arrangement of elements or components that are fastened together, particularly, in which movement, vibration or thermal expansion of the structure 400 (e.g., the first structure member 402 and the second structure member 404 relative to each other) may tend to loosen fasteners used to fasten the structure members together.

The disclosed fastener system 100 is configured to fasten the first structure member 402 and the second structure member 404 together. The first structure member 402 includes a first fastener aperture 414. The second structure member 404 includes a second fastener aperture 416. The first fastener aperture 414 and the second fastener aperture 416 are aligned with each other upon abutment of the first structure member 402 and the second structure member 404.

The anchor 104 is configured to be inserted within the first fastener aperture 414 of the first structure member 402. As an example, the nut plate 172 is inserted into and held within the first fastener aperture 414. The nut plate 172 is connected to the first structure member 402 in such a way as to prevent rotation of the nut plate 172, about the nut plate center axis 174 (FIG. 1).

As examples, the nut plate 172 may be held within the first fastener aperture 414 by an interference fit or a press fit (e.g., swaged). As another example, the nut plate 172 may be potted or bonded within the first fastener aperture 414, for example, by a liquid potting compound or adhesive, to bond an exterior sidewall 200 (FIG. 1) of the nut plate 172 to an inner diameter of the first fastener aperture 414 and/or the flange 182 of the nut plate 172 to the first interface surface 408 of the first structure member 402. As yet another example, the nut plate 172 may be fastened within the first fastener aperture 414, for example, with mechanical fasteners, such as screws or rivets, fastening the flange 182 to the first interface surface 408 of the first structure member 402.

As illustrated in FIG. 2, during installation, the fastener 102 is inserted through the second fastener aperture 416 of the second structure member 404 and into engagement with the nut 132 such that the male threads 124 (FIG. 1) of the fastener 102 and female threads 140 (FIG. 1) of the nut 132 are in mating engagement. As described herein above, the nut plate 172 prohibits rotation of the nut 132 such that the fastener 102 can be tightened.

The fastener 102 is then rotated in a first direction, as indicated by directional arrow 418, until the fastener 102 is completely installed and suitably tightened to nut 132 to join the second structure member 404 and the first structure member 402 together. As used herein, the first direction, or first rotational direction, is the rotational direction of the fastener 102, about the fastener center axis 106 (FIG. 1), to tighten the fastener 102 (i.e., a tightening direction), for example, a clockwise direction.

As an example, the fastener 102 may be completely installed when a required clamp load is applied to the structure 400, for example, as measured by torque. As another example, the fastener 102 may be completely installed when the shoulder 122 of fastener 102 is in contact with the nut plate 172 (e.g., the bracket 184). As yet another example, the fastener 102 may be completely installed when the fastener head 114 is flush with the opposed surface 412 of the second structure member 404 (e.g., the exterior surface of the structure 400). In certain embodiments, the second fastener aperture 416 may include a counterbore 424 configured to receive the fastener head 114.

During installation of the fastener 102 and engagement with the nut 132, the lock plate 142 is biased into positioned within the nut recess 154 by the biasing element 166. Upon the fastener 102 being completely installed, the lock plate 142 is biased into engagement with the fastener 102 by the biasing element 166.

As an example, upon a final rotation of the fastener 102 in the first direction 418, the fastener 102 may be in a position such that the fastener locking feature 202 and the lock plate locking feature 204 are aligned and interlocked, as illustrated in FIG. 2. In this position, the fastener engagement surface 208 and the lock plate engagement surface 206 are engaged and the lock plate locking feature 204 and the fastener locking feature 202 are interlocked such that the lock plate 142 prohibits rotation of the fastener 102 in a second direction, as indicated by directional arrow 420. As used herein, the second direction, or second rotational direction, is the rotational direction of the fastener 102, about the fastener center axis 106 (FIG. 1), opposite the first direction to loosen the fastener 102 (i.e., a loosening direction), for example, a counter-clockwise direction.

As described herein, in certain configurations of the fastener locking feature 202 and the lock plate locking feature 204, upon engagement of the fastener engagement surface 208 and the lock plate engagement surface 206 and interlocking engagement of the lock plate locking feature 204 and the fastener locking feature 202, the lock plate 142 also prohibits rotation of the fastener 102 in the first direction 418.

As another example, upon the final rotation of the fastener 102 in the first direction 418, the fastener 102 may be in a position such that the fastener locking feature 202 and the lock plate locking feature 204 are not aligned and not interlocked. In this position, the fastener engagement surface 208 and the lock plate engagement surface 206 may be in contact, however, the lock plate locking feature 204 and the fastener locking feature 202 are not aligned and interlocked. As an example, the fastener locking feature 202 may in in contact with the lock plate engagement surface 206, but not in interlocking engagement with the lock plate locking feature 204. As an example, the lock plate locking feature 204 may be in contact with the fastener engagement surface 208, but not in interlocking engagement with the fastener locking feature 202. As such, the lock plate 142 allows partial rotation of the fastener 102 in either the first direction 418 or the second direction 420 until the fastener locking feature 202 and the lock plate locking feature 204 are aligned and interlocked.

As an example, the fastener 102 may be manually partially rotated (e.g., in the first direction 418 or the second direction 420) until the fastener locking feature 202 and the lock plate locking feature 204 are aligned and interlocked.

As another example, the fastener 102 may be allowed to naturally partially rotate (e.g., in the second direction 420), for example, due to vibrations or thermal expansion, until the fastener locking feature 202 and the lock plate locking feature 204 are aligned and interlocked. As such, in situations where the lock plate locking feature 204 and the fastener locking feature 202 are not initially aligned and interlocked following installation of the fastener 102, the lock plate 142 is self-locking in response to partial rotation in the second direction 420 (e.g., loosening of the fastener 102).

Further, in situations where the lock plate locking feature 204 and the fastener locking feature 202 are not initially aligned and interlocked, the lock plate locking feature 204 and the fastener locking feature 202 may be configured to limit the amount of partial rotation of the fastener 102, for example, in the first direction 418 or the second direction 420. As an example, the lock plate locking feature 204 and the fastener locking feature 202 may be configured to limit rotation to one-half (½) of a rotation. As an example, the lock plate locking feature 204 and the fastener locking feature 202 may be configured to limit rotation to one-quarter (¼) of a rotation. As yet an example, the lock plate locking feature 204 and the fastener locking feature 202 may be configured to limit rotation to one-eighth (⅛) of a rotation.

FIG. 3 is a schematic elevation view, in section, of an exemplary embodiment of the disclosed fastener system 100. FIG. 3 illustrates the fastener system 100 installed on the structure 400 with disengagement of the lock plate locking feature 204 of the lock plate engagement surface 206 of the lock plate 142 from the fastener locking feature 202 of the fastener engagement surface 208 of the fastener 102.

In an example implementation, the tool 300 is configured to disengage the lock plate 142 from the fastener 102. As an example, the lock plate 142 is disengaged from the fastener 102 during removal of the fastener 102 from the structure 400. Removal of the fastener 102 may be necessary, for example, to remove the second structure member 404 from the first structure member 402, for example, in order to repair or replace the second structure member 404 and/or access the first structure member 402. As another example, and depending upon the configuration of the fastener locking feature 202 and the lock plate locking feature 204, the lock plate 142 is disengaged from the fastener 102 during installation of the fastener 102 on the structure 400.

In an example embodiment, the tool 300 includes a pin 302. The pin 302 is configured to extend through the fastener 102 and engage the lock plate 142. As an example, the pin 302 is configured to be inserted into and extend through the fastener channel 210 of the fastener 102 and engage the lock plate engagement surface 206 of the lock plate 142. A force F applied to the pin 302 depresses (e.g., compresses) the biasing element 166 and linearly moves the lock plate 142 away from the fastener 102. Movement of the lock plate 142 away from the fastener 102 disengages the lock plate locking feature 204 from the fastener locking feature 202 and allows the fastener 102 to be rotated in the second direction 420 (FIG. 2).

The tool 300 also includes tool head 306 having a driver 304. The driver 304 is configured to engage the fastener head 114. As an example, the driver 304 may be configured to be inserted within and engage the socket 126. As examples, the driver 304 may be a Torx® driver, an Allen driver or a driver with any other suitable configuration.

In an example embodiment, the tool head 306 includes a tool head channel (not illustrated) and the driver 304 includes a driver channel (not illustrated). The pin 302 extends through the tool head channel and the driver channel such that the position of the tool head 306 relative to the pin 302 may change as the fastener 102 is installed or removed.

Figure 4:
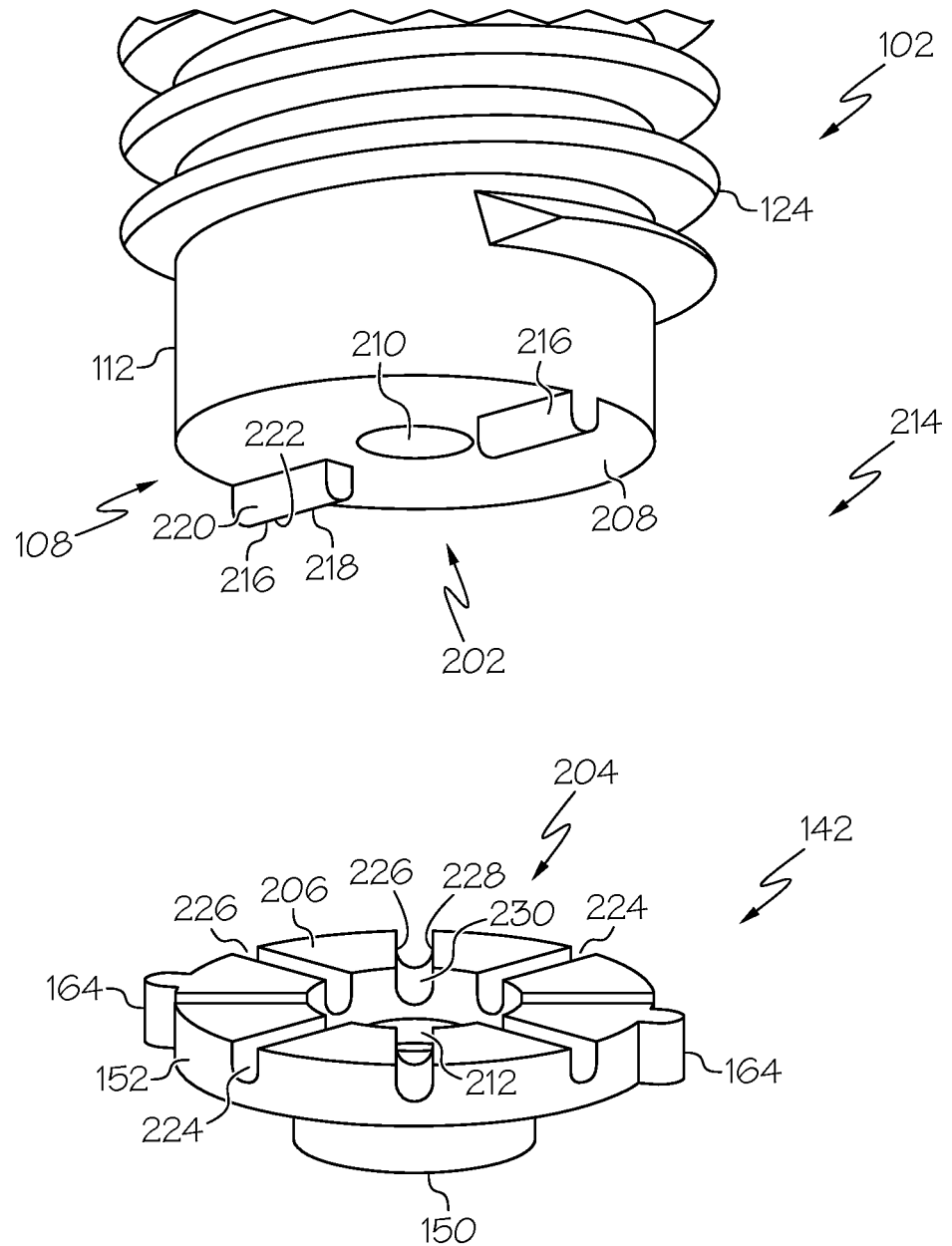
FIG. 4 is a schematic perspective view of an embodiment of an anti-rotational locking interface of the disclosed fastener system.

FIG. 4 is a schematic perspective view of an embodiment of a locking interface 214 of the disclosed fastener system 100. The fastener locking feature 202 of the fastener engagement surface 208 of the fastener 102 and the lock plate locking feature 204 of the lock plate engagement surface 206 of the lock plate 142 form the locking interface 214.

In this embodiment, the fastener locking feature 202 includes at least two fastener protrusions 216. In the illustrative embodiment, the fastener locking feature 202 includes two fastener protrusions 216. In other example embodiments, the fastener locking feature 202 may include more than two (e.g., three, four, six, eight, twelve, etc.) fastener protrusions 216.

The fastener protrusions 216 extend or protrude longitudinally outward from the fastener engagement surface 208. Each fastener protrusion 216 may include a first fastener protrusion facet 218 and an opposing second fastener protrusion facet 220. In this example, each of the first fastener protrusion facet 218 and the second fastener protrusion facet 220 may be a flat. In this example, the first fastener protrusion facet 218 and the second fastener protrusion facet 220 may be connected, opposite the fastener engagement surface 208, by a radiused, chamfered or concave third fastener protrusion facet 222.

Each one of the fastener protrusions 216 is equally spaced apart from an adjacent one of the fastener protrusions 216. In the illustrative example, two fastener protrusions 216 are spaced apart from each other by a 180-degree angle. In another example, four fastener protrusions 216 may be spaced apart from each other by a 90-degree angle. In another example, six fastener protrusions 216 may be spaced apart from each other by a 60-degree angle. In yet another example, eight fastener protrusions 216 may be spaced apart from each other by a 45-degree angle.

In this embodiment, the lock plate locking feature 204 includes at least two lock plate recesses 224. In the illustrative embodiment, the lock plate locking feature 204 includes eight lock plate recesses 224. In other example embodiments, the lock plate locking feature 204 may include less than eight (e.g., two, three, four, six, etc.) or more than eight (e.g., ten, twelve, etc.) lock plate recesses 224.

In the illustrative embodiment, the lock plate recesses 224 extent or protrude longitudinally inward from the lock plate engagement surface 206 (e.g., are formed in the lock plate engagement surface 206). The lock plate recesses 224 have an interior shape being complementary to matching an exterior shape of the fastener protrusions 216. Each lock plate recess 224 may include a first lock plate recess facet 226 and an opposing second lock plate recess facet 228. In the illustrative example, each of the first lock plate recess facet 226 and the second lock plate recess facet 228 may be a flat. In this example, the first lock plate recess facet 226 and the second lock plate recess facet 228 may converge to form a concave third lock plate recess facet 230.

Each one of the lock plate recesses 224 is equally spaced apart from an adjacent one of the lock plate recesses 224. In the illustrative example, eight lock plate recesses 224 are spaced apart from each other by a 45-degree angle. In another example, four lock plate recesses 224 may be spaced apart from each other by a 90-degree angle. In yet another example, two lock plate recesses 224 may be spaced apart from each other by a 180-degree angle.

Upon alignment and interlocking engagement of the fastener locking feature 202 and the lock plate locking feature 204, the fastener protrusions 216 are received within the lock plate recesses 224 such that the first fastener protrusion facet 218 is in flush contact with the first lock plate recess facet 226, the second fastener protrusion facet 220 is in flush contact with the second lock plate recess facet 228 and the third fastener protrusion facet 222 is in flush contact with the third lock plate recess facet 230.

Accordingly, the portion of a rotation of the fastener 102 permitted by the lock plate 142, in situations where the lock plate locking feature 204 and the fastener locking feature 202 are not initially aligned and interlocked, may be determined by one of the number of fastener protrusions 216 or the number of lock plate recesses 224. It should be understood that the number of lock plate recesses 224 is equal to or greater than the number of fastener protrusions 216. It should further be understood that the number of lock plate recesses 224 is evenly divisible by the number of fastener protrusions 216.

As an example, where the fastener locking feature 202 includes two fastener protrusions 216, the corresponding lock plate locking feature 204 may include two lock plate recesses 224, for example, to limit rotation to one-half (½) of a rotation. As another example, where the fastener locking feature 202 includes two fastener protrusions 216, the corresponding lock plate locking feature 204 may include four lock plate recesses 224, for example, to limit rotation to one-quarter (¼) of a rotation. As yet another example, where the fastener locking feature 202 includes two fastener protrusions 216, the corresponding lock plate locking feature 204 may include eight lock plate recesses 224, for example, to limit rotation to one-half (⅛) of a rotation.

In this embodiment, the (e.g., at least two) lock plate recesses 224 receive the (e.g., at least two) fastener protrusions 216 upon alignment of the fastener locking feature 202 and the lock plate locking feature 204. The lock plate 142 is configured to prohibit rotation of the fastener 102 in the first direction 418 upon the lock plate recesses 224 receiving the fastener protrusions 216.

Figure 5:
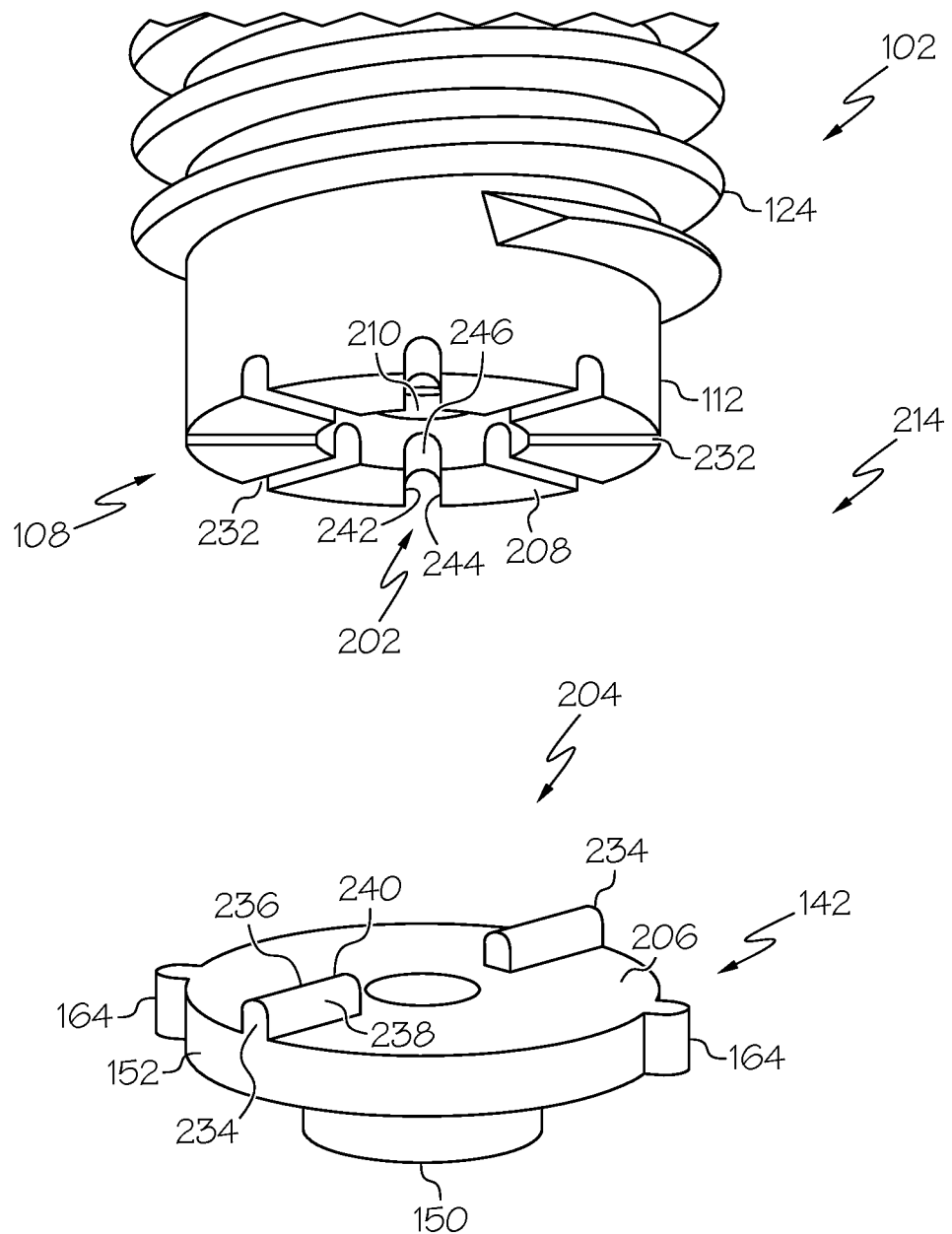
FIG. 5 is a schematic perspective view of another embodiment of the anti-rotational locking interface of the disclosed fastener system.

FIG. 5 is a schematic perspective view of another embodiment of the locking interface 214 of the disclosed fastener system 100.

In this embodiment, the lock plate locking feature 204 includes at least two lock plate protrusions 234. In the illustrative embodiment, the lock plate locking feature 204 includes two lock plate protrusions 234. In other example embodiments, the lock plate locking feature 204 may include more than two (e.g., three, four, six, eight, twelve, etc.) lock plate protrusions 234.

The lock plate protrusions 234 extend or protrude longitudinally outward from the lock plate engagement surface 206. Each lock plate protrusion 234 may include a first lock plate protrusion facet 236 and an opposing second lock plate protrusion facet 238. In this example, each of the first lock plate protrusion facet 236 and the second lock plate protrusion facet 238 may be a flat. In this example, the first lock plate protrusion facet 236 and the second lock plate protrusion facet 238 may be connected, opposite the fastener engagement surface 208, by a radiused, chamfered or concave third lock plate protrusion facet 240.

Each one of the lock plate protrusions 234 is equally spaced apart from an adjacent one of the lock plate protrusions 234. In the illustrative example, two lock plate protrusions 234 are spaced apart from each other by a 180-degree angle. In another example, four lock plate protrusions 234 may be spaced apart from each other by a 90-degree angle. In another example, six lock plate protrusions 234 may be spaced apart from each other by a 60-degree angle. In yet another example, eight lock plate protrusions 234 may be spaced apart from each other by a 45-degree angle.

In this embodiment, the fastener locking feature 202 includes at least two fastener recesses 232. In the illustrative embodiment, the fastener locking feature 202 includes eight fastener recesses 232. In other example embodiments, the fastener locking feature 202 may include less than eight (e.g., two, three, four, six, etc.) or more than eight (e.g., ten, twelve, etc.) fastener recesses 232.

In the illustrative embodiment, the fastener recesses 232 extend or protrude longitudinally inward from the fastener engagement surface 208. The fastener recesses 232 have an interior shape matching an exterior shape of the lock plate protrusions 234. Each fastener recess 232 may include a first fastener recess facet 242 and an opposing second fastener recess facet 244. In the illustrative example, each of the first fastener recess facet 242 and the second fastener recess facet 244 may be a flat. In this example, the first fastener recess facet 242 and the second fastener recess facet 244 may converge to form a concave third fastener recess facet 246.

Each one of the fastener recesses 232 is equally spaced apart from an adjacent one of the fastener recesses 232. In the illustrative example, eight fastener recesses 232 are spaced apart from each other by a 45-degree angle. In another example, four fastener recesses 232 may be spaced apart from each other by a 90-degree angle. In yet another example, two fastener recesses 232 may be spaced apart from each other by a 180-degree angle. Other configurations are also contemplated.

Upon alignment and interlocking engagement of the fastener locking feature 202 and the lock plate locking feature 204, the lock plate protrusions 234 are received within the fastener recesses 232 such that the first lock plate protrusion facet 236 is in flush contact with the first fastener recess facet 242, the second lock plate protrusion facet 238 is in flush contact with the second fastener recess facet 244 and the third lock plate protrusion facet 240 is in flush contact with the third fastener recess facet 246.

Accordingly, the portion of a rotation of the fastener 102 permitted by the lock plate 142, in situations where the lock plate locking feature 204 and the fastener locking feature 202 are not initially aligned and interlocked, may be determined by one of the number of lock plate protrusions 234 or the number of fastener recesses 232. It should be understood that the number of fastener recesses 232 is equal to or greater than the number of lock plate protrusions 234. It should further be understood that the number of fastener recesses 232 is evenly divisible by the number of lock plate protrusions 234.

As an example, where the lock plate locking feature 204 includes two lock plate protrusions 234, the corresponding fastener locking feature 202 may include two fastening recesses 232, for example, to limit rotation to one-half (½) of a rotation. As another example, where the lock plate locking feature 204 includes two lock plate protrusions 234, the corresponding fastener locking feature 202 may include four fastener recesses 232, for example, to limit rotation to one-quarter (¼) of a rotation. As yet another example, where the lock plate locking feature 204 includes two lock plate protrusions 234, the corresponding fastener locking feature 202 may include eight fastener recesses 232, for example, to limit rotation to one-half (⅛) of a rotation.

In the embodiments illustrated in FIGS. 4 and 5, when the lock plate locking feature 204 and the fastener locking feature 202 are aligned and in interlocking engagement, the lock plate 142 is configured to prohibit rotation of the fastener 102 in the second direction 420 and in the first direction 418 (FIG. 2). Therefore, in order to completely install the fastener 102, the tool 300 may be used to depress the biasing element 166 and move the lock plate 142 away from fastener 102, as illustrated in FIG. 3.

In this embodiment, the (e.g., at least two) lock plate protrusions 234 enter the (e.g., at least two) fastener recesses 232 upon alignment of the fastener locking feature 202 and the lock plate locking feature 204. The lock plate 142 is configured to prohibit rotation of the fastener in the first direction 418 upon the lock plate protrusions 234 entering the fastener recesses 232.

Figure 6:
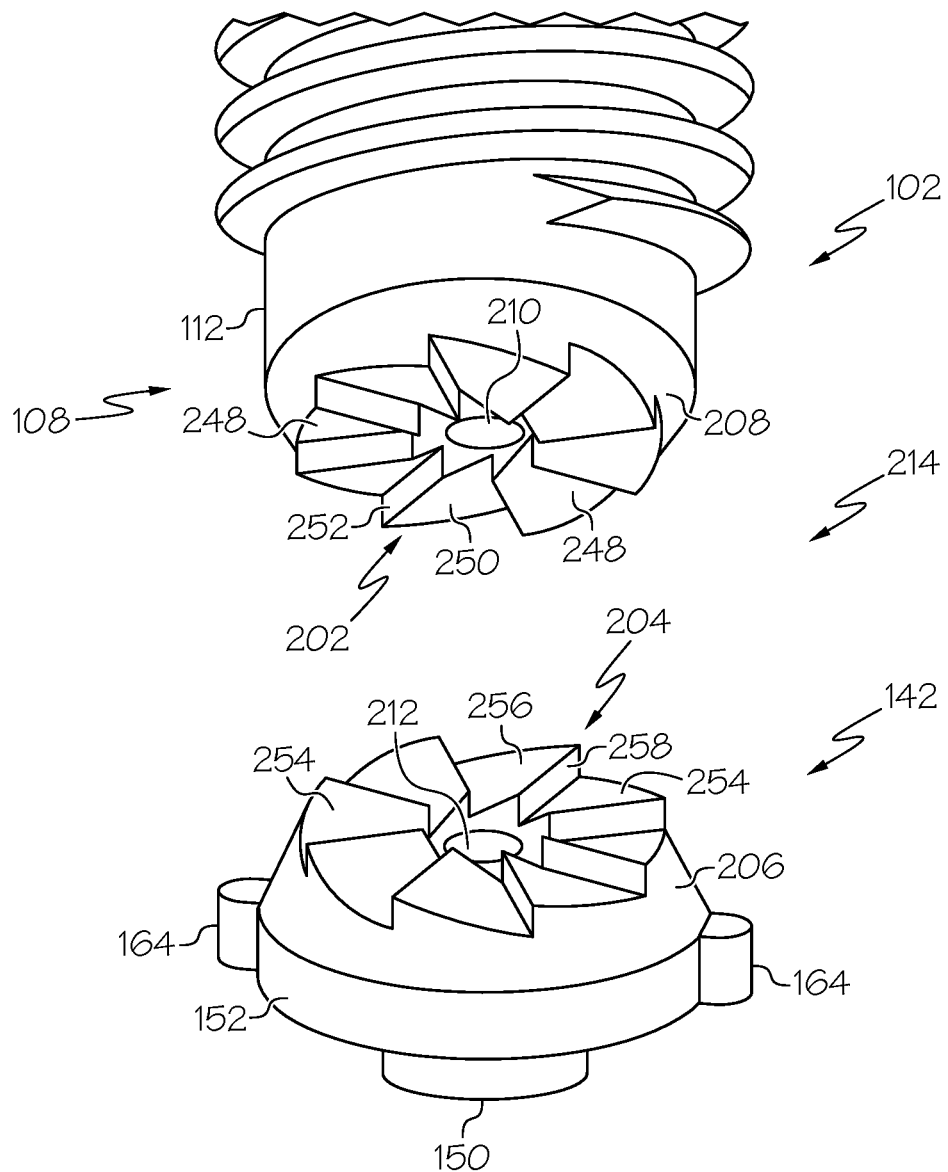
FIG. 6 is a schematic perspective view of another embodiment of the anti-rotational locking interface of the disclosed fastener system.

FIG. 6 is a schematic perspective view of another embodiment of the locking interface 214 of the disclosed fastener system 100.

In this embodiment, the fastener locking feature 202 includes at least two fastener teeth 248, also referred to individually as a fastener tooth 248. In the illustrative embodiment, the fastener locking feature 202 includes eight fastener teeth 248. In other examples, the fastener locking feature 202 may include more than two (e.g., three, four, six, eight, twelve, etc.) fastener teeth 248.

The fastener teeth 248 extend or protrude helically outward from the fastener engagement surface 208. Each fastener tooth 248 may include a first fastener tooth facet 250 oblique to the fastener center axis 106 (FIG. 1) and a second fastener tooth facet 252 parallel to the fastener center axis 106. In this example, the first fastener tooth facet 250 may be flat, concave or convex and the second fastener tooth facet 252 may be flat.

In this embodiment, each one of the second fastener tooth facets 252 is equally spaced apart from an adjacent one of the second fastener tooth facets 252. In the illustrative embodiment, eight second fastener tooth facets 252 associated with eight fastener teeth 248 may be spaced apart from each other by a 45-degree angle.

Figure 7:
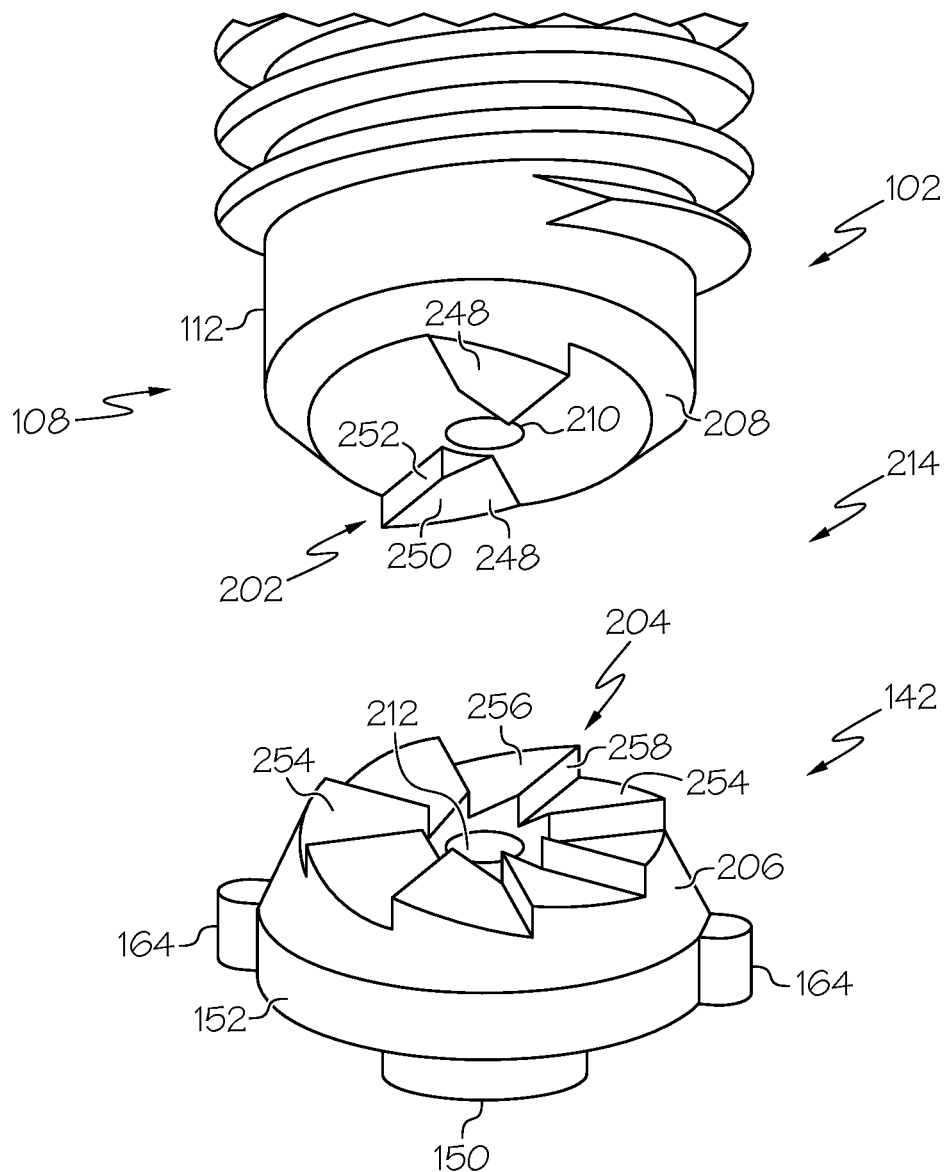
FIG. 7 is a schematic perspective view of another embodiment of the anti-rotational locking interface of the disclosed fastener system.

FIG. 7 is a schematic perspective view of another embodiment of the locking interface 214 of the disclosed fastener system 100. In the illustrative embodiment, two second fastener tooth facets 252 associated with two fastener teeth 248 may be spaced apart from each other by a 180-degree angle.

In another embodiment, four second fastener tooth facets 252 associated with four fastener teeth 248 may be spaced apart from each other by a 90-degree angle. In yet another embodiment, six second fastener tooth facets 252 associated with six fastener teeth 248 may be spaced apart from each other by a 60-degree angle. Other configurations are also contemplated.

Referring to FIGS. 6 and 7, in these illustrative embodiments, the lock plate locking feature 204 includes at least two lock plate pawls 254, also referred to individually as a lock plate pawl 254. In the illustrative embodiments, the lock plate locking feature 204 includes eight lock plate pawls 254. In other example embodiments, the lock plate locking feature 204 may include less than eight (e.g., two, three, four, six, etc.) or more than eight (e.g., ten, twelve, etc.) lock plate pawls 254.

In the illustrative embodiments, the lock plate pawls 254 extend or protrude helically outward from the lock plate engagement surface 206. The lock plate pawls 254 have a profile shape being complementary to and matching a profile shape of the fastener teeth 248. Each lock plate pawl 254 may include a first lock plate pawl facet 256 oblique to the fastener center axis 106 (FIG. 1) and a second lock plate pawl facet 258 parallel to the fastener center axis 106. In this example, the first lock plate pawl facet 256 may be flat, concave or convex and the second lock plate pawl facet 258 may be flat.

In this embodiment, each one of the second lock plate pawl facet 258 is equally spaced apart from an adjacent one of the second lock plate pawl facet 258. In the illustrative embodiment, eight second lock plate pawl facet 258 associated with eight lock plate pawls 254 may be spaced apart from each other by a 45-degree angle. In another embodiment, four second lock plate pawl facet 258 associated with four lock plate pawls 254 may be spaced apart from each other by a 90-degree angle. In yet another embodiment, six second lock plate pawl facet 258 associated with six lock plate pawls 254 may be spaced apart from each other by a 60-degree angle. Other configurations are also contemplated.

Upon alignment and interlocking engagement of the fastener locking feature 202 and the lock plate locking feature 204, the lock plate pawls 254 mate with the fastener teeth 248 such that the first lock plate pawl facet 256 is in flush contact with the first fastener tooth facet 250 and the second lock plate pawl facet 258 is in flush contact with the second fastener tooth facet 252.

Accordingly, the portion of a rotation of the fastener 102 permitted by the lock plate 142, in situations where the lock plate locking feature 204 and the fastener locking feature 202 are not initially aligned and interlocked, may be determined by one of the number of lock plate pawls 254 or the number of fastener teeth 248. It should be understood that, in one embodiment, the number of lock plate pawls 254 is equal to or greater than the number of fastener teeth 248. In this embodiment, it should further be understood that the number of lock plate pawls 254 is evenly divisible by the number of fastener teeth 248. It should also be understood that, in another embodiment, the number of fastener teeth 248 is equal to or greater than the number of lock plate pawls 254. In this embodiment, it should further be understood that the number of fastener teeth 248 is evenly divisible by the number of lock plate pawls 254.

As an example, where the fastener locking feature 202 includes two fastener teeth 248, the corresponding lock plate locking feature 204 may include two lock plate pawls 254, for example, to limit rotation to one-half (½) of a rotation. As another example, where the fastener locking feature 202 includes two fastener teeth 248, the corresponding lock plate locking feature 204 may include four lock plate pawls 254, for example, to limit rotation to one-quarter (¼) of a rotation. As yet another example, where the fastener locking feature 202 includes two fastener teeth 248, the corresponding lock plate locking feature 204 may include eight lock plate pawls 254, for example, to limit rotation to one-half (⅛) of a rotation.

In this embodiment, the (e.g., at least two) fastener teeth 248 catch against the (e.g., at least two) lock plate pawls 254 upon alignment of the fastener locking feature 202 and the lock plate locking feature 204. The lock plate 142 is further configured to permit rotation of the fastener 102 in the first direction 418 upon the fastener teeth 248 catching against the lock plate pawls 254.

In the embodiments illustrated in FIGS. 6 and 7, when the lock plate locking feature 204 and the fastener locking feature 202 are aligned and in interlocking engagement, the lock plate 142 is configured to prohibit rotation of the fastener 102 in the second direction 420 (FIG. 2) but permit rotation of the fastener 102 in the first direction 418 (FIG. 2). As an example, the fastener teeth 248 may ratchet across the lock plate pawls 254 to depress the biasing element 166 and move the lock plate 142 away from the fastener 102, when the fastener 102 is rotated in the first direction 418. Therefore, in order to completely install the fastener 102, the tool 300 (FIG. 3) may not be required.

Figure 8:
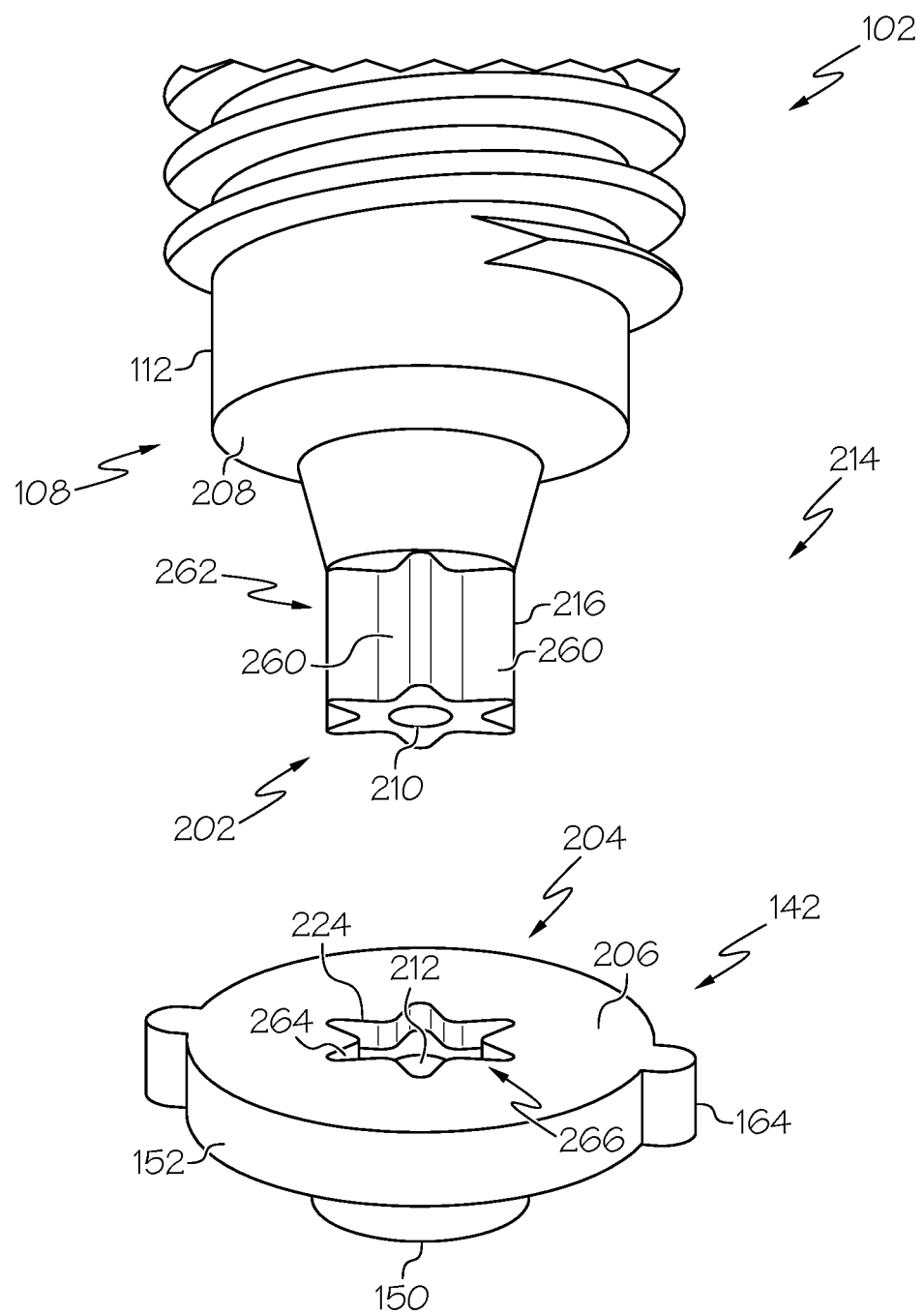
FIG. 8 is a schematic perspective view of another embodiment of the anti-rotational locking interface of the disclosed fastener system.

FIG. 8 is a schematic perspective view of another embodiment of the locking interface 214 of the disclosed fastener system 100.

In this embodiment, the fastener locking feature 202 includes one fastener protrusion 216. The fastener protrusion 216 extends or protrudes longitudinally outward from the fastener engagement surface 208. The fastener protrusion 216 includes a plurality of fastener protrusion facets 260 forming a cross-sectional shape 262. As an example, the cross-sectional shape 262 formed by the fastener protrusion facets 260 is a six-point star-shape (e.g., Torx®). As another example, the cross-sectional shape 262 formed by the fastener protrusion facets 260 is a hexagon. As yet another example, the cross-sectional shape 262 formed by the fastener protrusion facets 260 is a square. Various other two-dimensional geometric shapes are also contemplated as the cross-sectional shape 262 of the fastener protrusion 216.

In this embodiment, the fastener channel 210 extends through a center of the fastener protrusion 216 to permit the pin 302 of the tool 300 (FIG. 3) to access and engage the lock plate 142 and/or to permit the flow of cooling air through the fastener 102.

In this embodiment, the lock plate locking feature 204 includes one lock plate recess 224. The lock plate recess 224 extends or protrudes longitudinally inward into the lock plate engagement surface 206. The lock plate recess 224 is formed by a plurality of lock plate recess facets 264 forming a cross-sectional shape 266. The cross-sectional shape 266 of the lock plate recess 224 is complementary to and matches the cross-sectional shape 262 of the fastener protrusion 216. As an example, the cross-sectional shape 266 formed by the lock plate recess facets 264 is a six-point star-shape (e.g., Torx®). As another example, the cross-sectional shape 266 formed by the lock plate recess facets 264 is a hexagon. As yet another example, the cross-sectional shape 266 formed by the lock plate recess facets 264 is a square. Various other two-dimensional geometric shapes are also contemplated as the cross-sectional shape 266 of the lock plate recess 224.

In this embodiment, the lock plate channel 212 extends through a center of the lock plate recess 224 to permit the flow of cooling air through the lock plate 142.

Figure 9:
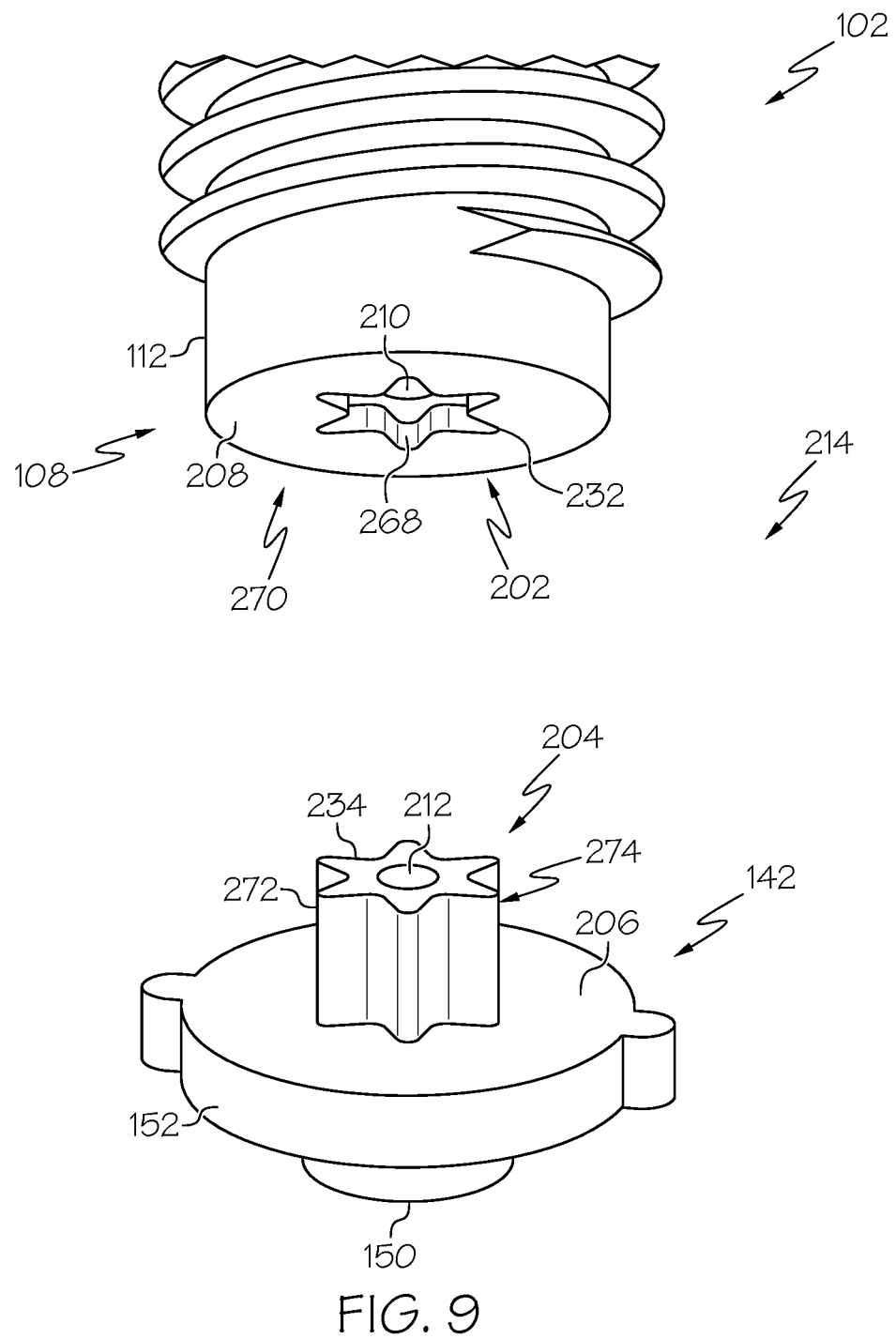
FIG. 9 is a schematic perspective view of another embodiment of the anti-rotational locking interface of the disclosed fastener system.

FIG. 9 is a schematic perspective view of another embodiment of the locking interface 214 of the disclosed fastener system 100.

In this embodiment, the fastener locking feature 202 includes one fastener recess 232. The fastener recess 232 extends or protrudes longitudinally inward into the fastener engagement surface 208. The fastener recess 232 includes a plurality of fastener recess facets 268 forming a cross-sectional shape 270. As an example, the cross-sectional shape 270 formed by the fastener recess facets 268 is a six-point star-shape (e.g., Torx®). As another example, the cross-sectional shape 270 formed by the fastener recess facets 268 is a hexagon. As yet another example, the cross-sectional shape 270 formed by the fastener recess facets 268 is a square. Various other two-dimensional geometric shapes are also contemplated as the cross-sectional shape 270 of the fastener recess 232.

In this embodiment, the fastener channel 210 extends through a center of the fastener recess 232 to permit the pin 302 of the tool 300 (FIG. 3) to access and engage the lock plate 142 and/or to permit the flow of cooling air through the fastener 102.

In this embodiment, the lock plate locking feature 204 includes one lock plate protrusion 234. The lock plate protrusion 234 extends or protrudes longitudinally outward form the lock plate engagement surface 206. The lock plate protrusion 234 includes a plurality of lock plate protrusion facets 272 forming a cross-sectional shape 274. The cross-sectional shape 274 of the lock plate protrusion 234 is complementary to and matches the cross-sectional shape 270 of the fastener recess 232. As an example, the cross-sectional shape 274 formed by the lock plate protrusion facets 272 is a six-point star-shape (e.g., Torx®). As another example, the cross-sectional shape 274 formed by the lock plate protrusion facets 272 is a hexagon. As yet another example, the cross-sectional shape 274 formed by the lock plate protrusion facets 272 is a square. Various other two-dimensional geometric shapes are also contemplated as the cross-sectional shape 274 of the lock plate protrusion 234.

In the various embodiments of the disclosed fastener system 100, the particular configuration of the locking interface 214 of the fastener locking feature 202 and the lock plate locking feature 204 may depend on various factors, such as the force (e.g., torque) applied to the fastener 102 during operation or use of the structure 400, the materials used to make the fastener 102 and/or the lock plate 142 (e.g., metal, ceramic, plastic, etc.), the manufacturability (e.g., cost, complexity, time, etc.) of the particular fastener locking feature 202 and lock plate locking feature 204 given the materials used to make the fastener 102 and/or the lock plate 142, respectively, and the like.

Similarly, the materials used to make the disclosed fastener system 100, including the fastener 102, the nut 132, the lock plate 142 and/or the nut plate 172, may be selected based on the particular application of the fastener system 100, the manufacturability (e.g., cost, complexity, time, etc.) of the particular fastener locking feature 202 and lock plate locking feature 204 with the selected materials, the temperatures experienced during operation or use of the structure 400, thermal expansion factors and the like.

In an example embodiment, at least one of the fastener 102, the nut 132, the lock plate 142 and/or the nut plate 172 may be made of metal or metal allow. As general examples, at least one of the fastener 102, the nut 132, the lock plate 142 and/or the nut plate 172 may be made of an Inconel superalloy (e.g., PM2000 or PM1000), molybdenum, tungsten, titanium, niobium, chrome or Hastelloy (e.g., nickel-based steel alloys) and the like. As specific examples, at least one of the fastener 102, the nut 132, the lock plate 142 and/or the nut plate 172 may be made of superalloy PM2000 (e.g., a highly oxidation resistant and extremely creep resistant ferritic iron-chromium-based alloy). As an example, metal may be selected as the material of at least one of the fastener 102, the nut 132, the lock plate 142 and/or the nut plate 172 when the expected maximum temperature experienced by the fastener 102 is less than approximately 2,300° F. (1,260° C.) and the same for the structure 400, but if the fastener 102 is actively cooled the structure around the fastener 102 may experience a maximum temperature of more than approximately 2,300° F. (1,260° C.). As an example, when metal is selected as the material for at least one of the fastener 102 and/or the lock plate 142, any of the disclosed embodiments of the locking interface 214 (e.g., FIGS. 4-9) may be used, for example, due to the manufacturability of metal.

In another example embodiment, at least one of the fastener 102, the nut 132, the lock plate 142 and/or the nut plate 172 may be made of plastic. As a general example, at least one of the fastener 102, the nut 132, the lock plate 142 and/or the nut plate 172 may be made of a high temperature resistant plastic or polymer. As a specific example, at least one of the fastener 102, the nut 132, the lock plate 142 and/or the nut plate 172 may be made of Polybenzimidazole (PBI). PBI may offer particular benefits and/or advantages because it has extremely good mechanical strength properties even at continuous very high temperatures, for example, at least approximately 800° F. (426° C.). PBI may also be machined or mold into shape. As another specific example, at least one of the fastener 102, the nut 132, the lock plate 142 and/or the nut plate 172 may be made of Polyphenylsulfone (PPSF). PPSF also has good mechanical strength properties at high temperatures and may be molded into shape and 3D printed. As a general example, at least one of the fastener 102, the nut 132, the lock plate 142 and/or the nut plate 172 may be made of polyimide base polymers, which is another high temperature resistant polymer system. Optionally, any of these polymers may be filled with inorganic fillers to increase polymer stiffness and mechanical properties. Further, heat treating of the polymers may also increase the amount of crystallization of the polymer and raise the polymer glass transition temperature (Tg). Those skilled in the art will recognize that while some polymers may survive for short periods of time at temperatures above approximately 800° F., survival is linked to the polymers limit do to oxidation. If, for example, oxygen is limited, such as in space, this is not the case and polymers may survive for longer periods of time and withstand temperatures greater than approximately 800° F.

As an example, a high temperature resistant plastic like polyimides with high Tg, and, optionally, filled with a filler material, may be selected as the material of at least one of the fastener 102, the nut 132, the lock plate 142 and/or the nut plate 172 when the expected maximum temperature experienced by the structure 400 is less than continuous use of approximately 800° F. As an example, when high temperature plastic is selected as the material for at least one of the fastener 102 and/or the lock plate 142, any of the disclosed embodiments of the locking interface 214 (e.g., FIGS. 4-9) may be used, for example, due to the manufacturability of plastic.

In another example embodiment, at least one of the fastener 102, the nut 132, the lock plate 142 and/or the nut plate 172 may be made of ceramic. As an example, a ceramic may be selected as the material of at least one of the fastener 102, the nut 132, the lock plate 142 and/or the nut plate 172 when the expected maximum temperature experienced by the structure 400 is less than approximately 2,550° F. (1400° C.), for example, without active cooling of the fastener 102. As an example, when a ceramic is selected as the material for at least one of the fastener 102 and/or the lock plate 142, certain embodiments of the locking interface 214 (e.g., FIGS. 4, 5, 8 and 9) may be preferred, for example, due to the manufacturability of ceramic.

In yet another example embodiment, at least one of the fastener 102, the nut 132, the lock plate 142 and/or the nut plate 172 may be made of a ceramic composite that uses whicker reinforcement. As an example, the ceramic composite may be selected as the material of at least one of the fastener 102, the nut 132, the lock plate 142 and/or the nut plate 172 when the expected maximum temperature experienced by the structure 400 is less than 2,550° F. (1400° C.), for example, without active cooling of the fastener 102. As an example, when the ceramic composite is selected as the material for at least one of the fastener 102 and/or the lock plate 142, certain embodiments of the locking interface 214 (e.g., FIGS. 4, 5, 8 and 9) may be preferred, for example, due to the manufacturability of the ceramic composite.

As an example, a ceramic composite such as SiC/SiC or C/SiC may be selected as the material of at least one of the fastener 102, the nut 132, the lock plate 142 and/or the nut plate 172 when the expected maximum temperature experienced by the structure 400 is less than approximately 2,800° F. (1540° C.), for example, without active cooling of the fastener 102.

In yet another example embodiment, at least one of the fastener 102, the nut 132, the lock plate 142 and/or the nut plate 172 may be made of a carbon reinforced carbon composite (C/C) that uses continous fiber reinforcement. As an example, the carbon reinforced carbon composite may be selected as the material of at least one of the fastener 102, the nut 132, the lock plate 142 and/or the nut plate 172 when the expected maximum temperature experienced by the structure 400 is less than approximately 4,000° F. (2200° C.), for example, without active cooling of the fastener 102 when oxygen is limited. As an example, when the carbon reinforced carbon composite is selected as the material for at least one of the fastener 102 and/or the lock plate 142, certain embodiments of the locking interface 214 (e.g., FIGS. 4, 5, 8 and 9) may be preferred, for example, due to the manufacturability of the carbon reinforced carbon composite.

In certain of these embodiments, a hard ceramic matrix is reinforced with extremely strong, stiff, silicon-carbide whiskers. As an example, the fastener 102, the nut 132 and/or the lock plate 142 may be constructed of a ceramic matrix composite material that is a mixture of aluminum oxide ceramic material reinforced with silicon carbide whiskers. A specific example of a ceramic matrix composite material used to construct the fastener 102, the nut 132 and/or the lock plate 142 is the whisker reinforced ceramic material WG-300®, which is available from Greenleaf Corporation of Saegertown, Pa. In WG-300®, the percentage of silicon-carbide whiskers in the mixture of aluminum oxide ceramic material powder and the silicone carbine whiskers is approximately 30%. In other examples of the ceramic composite material used to construct the fastener 102, the nut 132 and/or the lock plate 142, the percentage of silicon-carbide crystal whiskers in the mixture of aluminum oxide ceramic material powder and the silicon-carbide whiskers is in a range of approximately 10% to approximately 70% of the mixture. As an alternative to using the mixture of aluminum oxide ceramic material powder and silicon-carbide whiskers in constructing the fastener 102, the nut 132 and/or the lock plate 142, silicon nitride ($Si_3N_4$) could be used in their place. A specific example of a silicon nitride material used to construct the fastener 102, the nut 132 and/or the lock plate 142 is XSYTIN™-1, which is available from Greenleaf Corporation. While other $Si_3N_4$ may work, the XSYTIN™-1 material may offer particular advantages and/or benefits because it is phase toughen, which also increases the material strength and fracture toughness. This is done by heat treating the $Si_3N_4$ In-Situ to elongate crystals gain growth in the hot press $Si_3N_4$. Both the SiC whisker incorporated reinforced alumina and the elongated crystallized silicon nitride material have whisker type of toughening reinforcement and are very high temperature capable for continuous use at approximately 2,550° F. (1400° C.) and 2,400° F. (1,315° C.), respectively. These materials are hot pressed to achieve almost full density with a very fine grain size, for example, to produce the fastener 102 having high strength, high modulus and high hardness with little to no degradation with temperature at a weight more than half that of superalloys.

Those skilled in the art will also recognize that phase toughened hot press XSYTIN-1 silicon nitride material has a very high fracture toughness of approximately 7.5 MPa√m and very high flexure strength of approximately 1,300 MPa compared to other non-phase toughened silicon nitride with fracture toughness of approximately 6 MPa√m and a flexure strength of approximately between 700-900 MPa, respectively. In general, silicon nitride toughness increases in toughness at temperatures greater than approximately 1,800° F. (980° C.). This combined with half the thermal expansion $3.5\times10^{-6}$/C, compared to WG-300 at $6\times10^{-6}$/C, makes it a promising material for use in making the fastener 102. In perspective, these ceramics are much lower than the thermal expansion of metals (e.g., Inconel 718 has a thermal expansion of $14-15\times10^{-6}$/C).

The whisker reinforcement or elongated grains provides high toughness properties that resists micro-cracking to the ceramic fastener and allows the male threads to be precision machined into the ceramic (without causing the ceramic to catastrophically fail), while also improving the mechanical reliability of the fastener 102. The toughness from the whisker reinforcement combines with the low thermal expansion and high thermal conductivity to greatly improve the thermal shock ability of the fastener 102.

The use of a alumina ($Al_2O_3$) SiC whisker reinforced ceramic material to design high temperature threaded fastener 102 may meet requirements of high strength and modulus over an entire temperature region with high fracture toughness and minimal notch sensitivity. This material also may have a low catalectic effect, a high emissivity, a high stiffness, a high hardness and good thermal shock resistance, while not scaling or being attached by hot atomic oxygen.

The WG-300 whisker reinforcement alumina has a fracture toughness of 10 MPa√m and hardness of 2100 with a flexural strength of 690 MPa and a fairly low CTE of $6\times10^{-6}$/° C. Thus, the SiC whisker not only improve fracture toughness, but also increases the emissivity of the fastener 102.

Further, the high emissivity of these ceramic materials along with their low catalytic effect keeps the faster 102 from overheating (compared to metals). This may be particularly beneficial for an atmospheric reentry vehicle or hypersonic vehicle where the outer mold line fastener 102 and TPS materials (e.g., the second structure member 404) need to be heat resistant, must endure very harsh environments, and require high yield and rupture strength over the entire temperature rage experienced by the vehicle. Unlike a metal fastener, the disclosed fastener 102 made from the ceramic composite material may have a low catalicity (e.g., to reduce recombination of atomic gasses at the outer surface of the vehicle), a high emissivity, be resistant to hot oxygen (particularly to atomic oxygen) and minimize scaling.

Even further, with the increased use of ceramic matrix composites (CMC) in engine environments, it may be particularly beneficial that the fastener 102 used in this environment have low coefficient of thermal expansion (CTE).

Thus, in an example embodiment, the fastener 102 may be made out of ceramic, such as silicon nitride ($Si_3N_4$), for example, XSYTIN™-1. In an example embodiment, the fastener 102 may be made out of another ceramic material that includes alumina reinforced with silicon carbide (SiC) whiskers, for example, WG-300®. In another example embodiment, the fastener 102 may be made out of other ceramics that include non-oxide ceramic matrix composites (CMC), such as C/SiC or SiC/SiC. Carbon/Carbon composites (C/C), and SiC ceramics.

In an alternative example embodiment, the fastener 102 may be made of metals, such as titanium or higher temperature superalloys, for example, Inconel, PM1000, PM2000, molybdenum, tungsten, titanium, niobium, chrome, and Hastelloy. As an example, PLANSEE PM2000 is commercially available superalloy that is highly oxidation resistant and an extremely creep resistant ferritic iron-chromium-based alloy. PM2000 may offer a particular benefit and/or advantage because it has good hot strength and creep strength up to approximately 2,460° F. (1,350° C.) and forms a dense and adherent $Al_2O_3$ scale that is highly resistant to high-speed gas flows up to approximately 2,375° F. (1,300° C.).

For applications at lower temperatures, the fastener 102 may be made of titanium. At even lower temperatures, the fastener 102 may be made of high temperature polymers, such as Polybenzimidazole (PBI) or Polyphenylsulfone (PPSF), since the fastener 102 may be actively cooled and the high temperature polymer can withstand approximately 800° F. (426° C.) with continuous use.

Additionally, nonmetallic options may be preferred in cases where radar is involved do to the reflective nature of metal.

In an example embodiment, the nut 132 may be made out of PBI or PPSF. In another example, the nut 132 may also be made of titanium or ceramic (e.g., WG-300®). In an example, the nut plate 172 may be made out of metal (e.g., titanium) or PBI or PPSF, when cooling is sufficient.

Generally, the temperature limits for C/C is approximately 4,000° F. (2,200° C.), C/SiC is approximately 2800° F. (1,540° C.), SiC/SiC is approximately 2500 F, WG-300® is approximately 2,500° F. (1,370° C.), $Si_3N_4$ is approximately 2,300° F. (1,260° C.), PM2000 is approximately 2,400° F. (1,315° C.), and PBI is approximately 800° F. (426° C.).

A preferred material for the fastener 102 in an engine environment may be $Si_3N_4$ nitride (e.g., XSYTIN™-1) or WG-300®, with the nut 132 being made out of PBI (e.g., plastic), for example, when the fastener 102 and the nut 132 are actively cooled and the temperature of the nut 132 stays below approximately 800° F. (426° C.). When the fastener 102 and the nut 132 are not actively cooled or the temperature of the nut 132 goes above approximately 800° F. (426° C.), the nut 132 may be a metal (e.g., titanium) or a ceramic (e.g., WG-300® or $Si_3N_4$). The $Si_3N_4$ may withstand temperatures of up to approximately 2,300° F. (1,260° C.) and WG-300® of up to approximately 2,500° F. (1,370° C.). Actively cooling the fastener 102 may allow the fastener 102 and/or the nut 132 to survive much higher temperatures experienced around the fastener 102. When the temperatures experienced around the fastener 102 are higher and oxygen is limited, for example, on reentry, higher strength may be required and continuous fiber CMC composites (e.g., C/SiC or C/C) may be used. Composites such as SiC/SiC may also be a good alternative for the fastener 102. Fasteners 102 made of metal are also an alternative, but not preferred for reentry due to their catalytic reaction with oxygen and low emissivity along with strength degradation. However, in many high temperature cases, the nut 132 may be made of metal.

Referring again to FIG. 2, the disclosed fastener system 100 may be configured to be actively cooled by a stream or flow of cooling air. As an example, the first structure member 402 may also include or define a cooling air plenum 422 (e.g., an open space filled with cooling air). The cooling air plenum 422 is in fluid communication with the nut plate channel 276, the lock plate channel 212 and the fastener channel 210. Upon installation of the fastener system 100, the nut plate channel 276, the lock plate channel 212 and the fastener channel 210 are aligned and in fluid communication with each other. In certain embodiments, the cross-sectional dimension (e.g., diameter) of at least a portion of the lock plate channel 212 is less than the cross-sectional dimension (e.g., diameter) of the fastener channel 210 to allow for the flow of cooling air but prohibit insertion of the pin 302 of the tool 300 (FIG. 3), for example, during installation or removal of the fastener 102.

Accordingly, in the various disclosed embodiments, the fastener system 100 advantageously provides for a high temperature resistant fastener system through the use of selected high temperature materials and/or actively cooled channels formed in the fastener 102, the lock plate 142 and the nut plate 172. Thus, the fastener system 100 advantageously provides a strong, reliable, and lightweight fastener 102 that is able to withstand extreme temperature environments and thermal shock.

In the various disclosed embodiments, the fastener system 100 also advantageously provides simple access to the fastener 102 from only one side of the structure 400 (e.g., from the outside surface of an aerospace vehicle, the inside surface of a jet engine nozzle and the like), which provides for quick service turnaround.

In the various disclosed embodiments, the fastener system 100 also advantageously provides for a low profile aerodynamic fastener 102 having an anti-rotational locking interface 214 that will not interfere with aerodynamic efficiency of the exterior surface of the structure 400.

Figure 10:
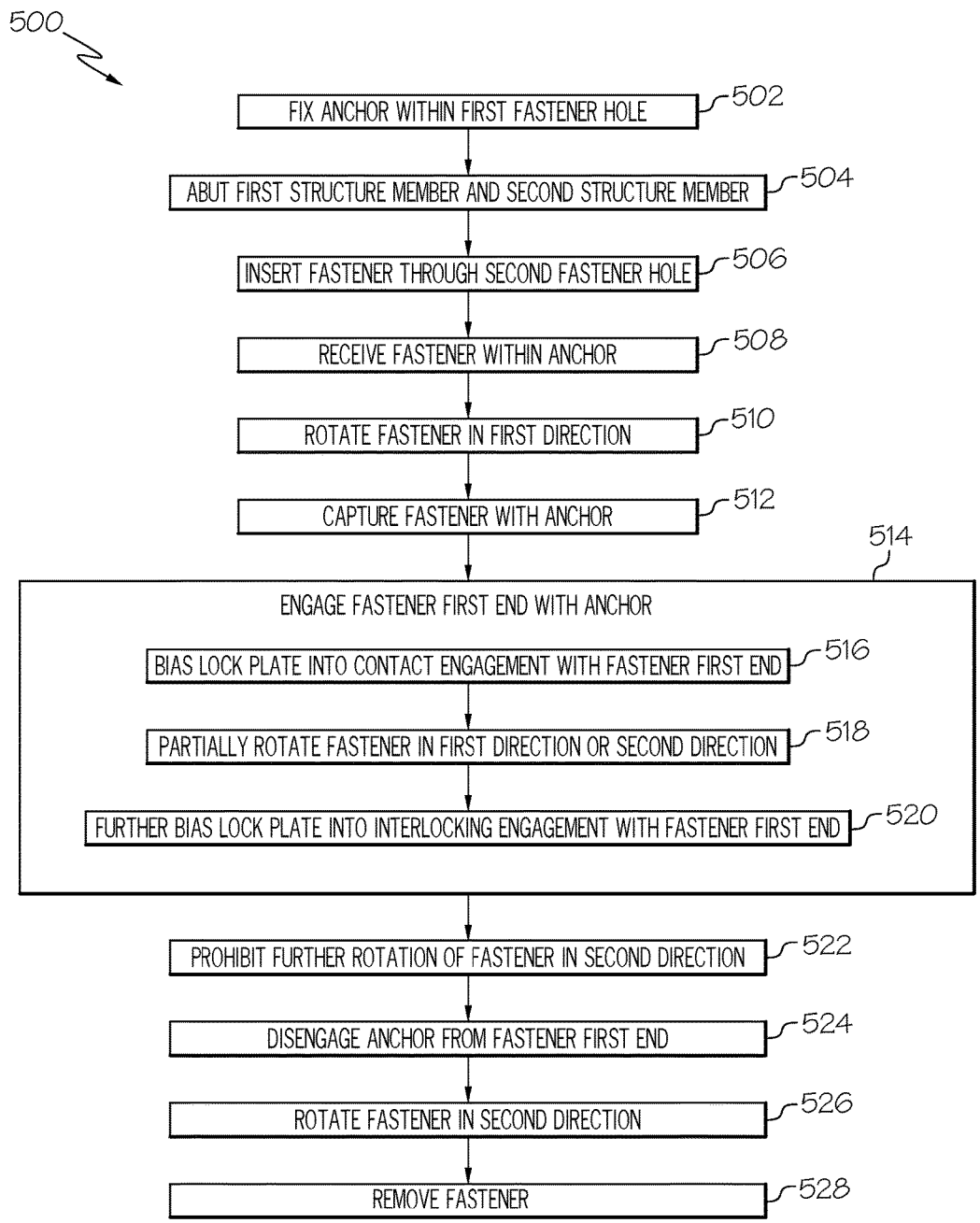
FIG. 10 is a flow diagram of an embodiment of the disclosed method for fastening a first structure member and a second structure member together.

FIG. 10 is a flow diagram illustrating an exemplary embodiment of a method 500 for fastening a first structure member to a second structure member, such as the first structure member 402 and the second structure member 404 of the structure 400 (FIGS. 2 and 3).

As shown at block 502, the anchor 104 is fixed within the first fastener aperture 414 of the first structure member 402. As an example, the nut plate 172 is inserted within the first fastener aperture 414 and attached to the first structure member 402.

As shown at block 504, the first structure member 402 and the second structure member 404 are abutted together with the first fastener aperture 414 and the second fastener aperture 416 substantially aligned.

As shown at block 506, the fastener 102 is inserted through the second fastener aperture 416. As shown at block 508, the fastener 102 is received within the anchor 104. As shown at block 510, the fastener 102 is rotated in the first direction 418. As shown at block 512, the fastener 102 is captured with the anchor 104. As an example, the nut 132 receives the fastener 102. Rotation of the fastener 102 in the first direction 418 engaged the male threads 124 of the fastener 102 and the female threads 140 of the nut 132 to capture the fastener 102.

As shown at block 514, the anchor 104 engages the fastener first end 108 of the fastener 102 upon complete rotation of the fastener 102. As an example, the anchor 104 engages the fastener locking feature 202 disposed on the fastener first end 108 of the fastener 102.

As used herein, the term "complete rotation" of the fastener 102 means rotation of the fastener 102 in the first direction 418 until the fastener 102 is completely installed and sufficiently tightened to the nut 132 to apply a desired clamping load (e.g., preload) to the structure 400.

As shown at block 516, engaging the fastener first end 108 of the fastener 102 with the anchor 104 (block 514) includes biasing the lock plate 142 into contact engagement with the fastener first end 108 of the fastener 102 upon complete rotation of the fastener 102 in the first direction 418. As shown at block 518, the fastener 102 is partially rotated in the first direction 418 or the second direction 420. As shown at block 520, engaging the fastener first end 108 of the fastener 102 with the anchor 104 (block 516) further includes further biasing the lock plate into interlocking engagement with the fastener first end upon the contact engagement and partial rotation of the fastener in the first direction or the second direction.

As used herein, the term "contact engagement" means that the anchor 104 is in contact with the fastener first end 108 of the fastener 102 and the anchor 104 permits partial rotation of the fastener 102 in either the first direction 418 or the second direction 420. As an example, and in accordance with certain embodiments, the rotational position of the fastener 102, upon complete rotation of the fastener 102, may place the fastener locking feature 202 of the fastener 102 in contact with the lock plate engagement surface 206 of the lock plate 142. In other words, the fastener locking feature 202 and the lock plate locking feature 204 are not aligned or engaged. Conversely, as another example, and in accordance with certain other embodiments, the rotational position of the fastener 102, upon complete rotation of the fastener 102, may place the lock plate locking feature 204 of the lock plate 142 in contact with the fastener engagement surface 208 of the fastener 102. In other words, the fastener locking feature 202 and the lock plate locking feature 204 are not aligned or engaged.

As used herein, the term "partial rotation" means additional rotation of the fastener 102 in the first direction 418 or the second direction 420 that minimally changes the rotational position of the fastener 102 and has essentially no effect on the clamping load applied to the structure 400.

As used herein, the term "interlocking engagement" means that the anchor 104 is interlocked with the fastener first end 108 of the fastener 102 and the anchor 104 prohibits further rotation of the fastener 102. As an example, the rotational position of the fastener 102, upon complete rotation of the fastener 102 or upon partial rotation following complete rotation of the fastener 102, may place the fastener locking feature 202 of the fastener 102 and the lock plate engagement surface 206 of the lock plate 142 in an interlocked relationship. In other words, the fastener locking feature 202 and the lock plate locking feature 204 are aligned and engaged.

As shown at block 522, upon engagement of the anchor with the fastener first end 108 of the fastener 102, the anchor 104 prohibits further rotation of the fastener 102 in the second direction 420.

As used herein, the term "further rotation" means additional, for example, undesired, rotation of the fastener 102 after complete rotation has been achieved, such as additional rotation that would tend to loosen the fastener 102 from the nut 132.

As described herein above, in certain circumstances, it may be necessary or desirable to remove the fastener 102 in order to remove the second structure member 404 and/or access the first structure member 402.

Thus, as shown at block 524, the anchor 104 is disengaged from the fastener first end 108 of the fastener 102. As an example, the pin 302 of the tool 300 is inserted through the fastener channel 210 and depresses biasing element 166 to move the lock plate 142 away from the fastener first end 108. Moving the lock plate 142 away from the fastener first end 108 disengages the lock plate locking feature 204 from the fastener locking feature 202 and permits rotation of the fastener 102 in the second direction 420. As shown at block 526, the fastener 102 is rotated in the second direction 420. As shown at block 528, the fastener 102 is then removed from the second structure member 404.

Figure 11:
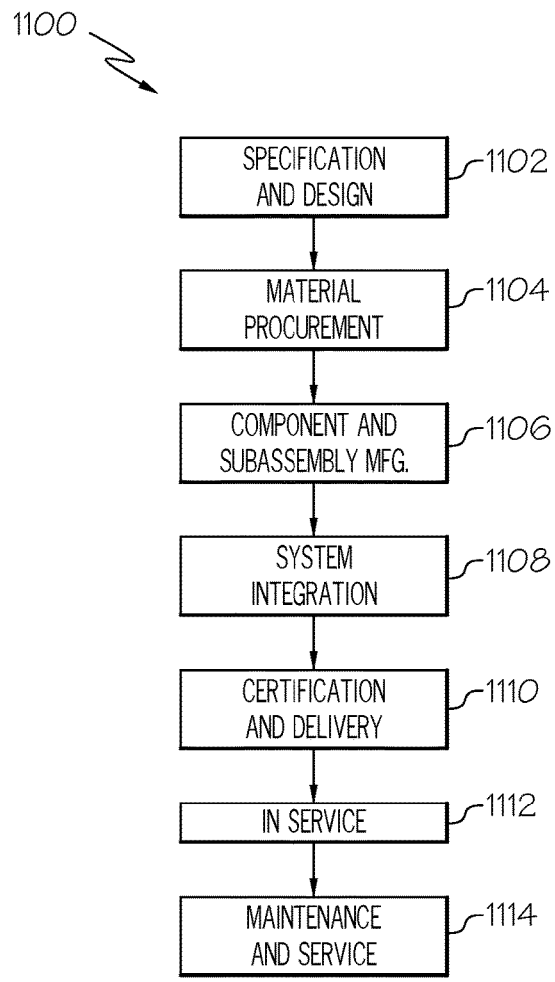
FIG. 11 is a schematic illustration of an aircraft.
Figure 12:
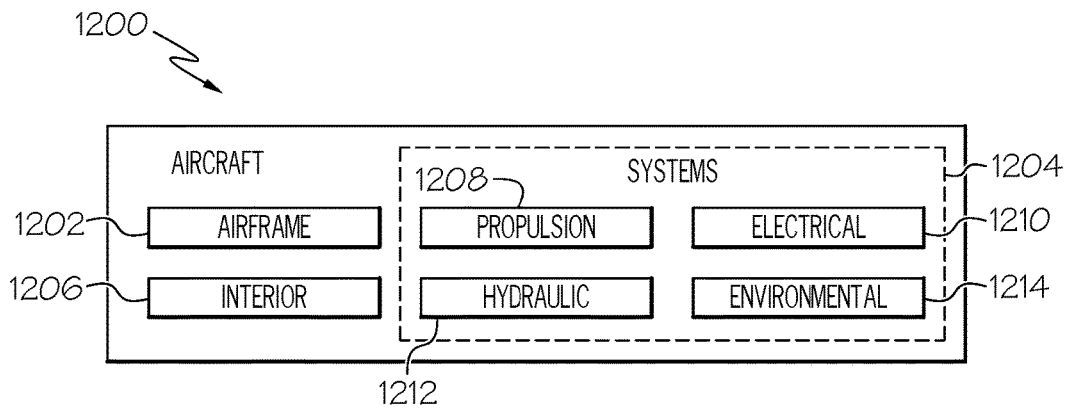
FIG. 12 is a schematic block diagram of aircraft production and service methodology.

Examples of the disclosed fastener system 100 and structure 400 joined using the disclosed fastener system 100 may be described in the context of an aircraft manufacturing and service method 1100 as shown in FIG. 11 and the aircraft 1200 as shown in FIG. 12.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Production of the disclosed fastener system 100 and use of the fastener system 100 to fastening the structure 400, as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, the aircraft 1200 produced by the illustrative method 1100 may include an airframe 1202, for example, having composite panels or other composite structures including the non-crimp fabric 100, a plurality of high-level systems 1204 and an interior 1206. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while the aircraft 1200 is in service (block 1112) and during maintenance and service stage (block 1114).

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIGS. 10 and 11, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10 and 11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments of the disclosed apparatus, systems and methods have been shown and described, modifications may occur to those skilled in the art upon reading the specification. The present application includes such modifications and is limited only by the scope of the claims.

What is claimed is:

1. A fastener system comprising:
   a fastener comprising a fastener first end, a longitudinally opposed fastener second end, and a fastener channel extending longitudinally through said fastener; and
   an anchor comprising:
      an anchor channel extending longitudinally through said anchor;
      a lock plate; and
      a biasing element connected to said lock plate; and
   wherein:
   said anchor is configured to receive and capture said fastener upon rotation of said fastener in a first direction;
   said biasing element is configured to bias said lock plate into engagement with said fastener first end upon complete rotation of said fastener in said first direction;
   said lock plate is configured to prohibit further rotation of said fastener in a second direction, opposite said first direction, upon interlocking engagement with said fastener first end; and
   with said fastener received by said anchor, said fastener channel and said anchor channel are aligned and in fluid communication with each other to enable a flow of a cooling airflow to pass through said anchor and said fastener.

2. The fastener system of claim 1 wherein said lock plate is further configured to prohibit said further rotation of said fastener in said first direction upon said interlocking engagement with said fastener first end.

3. The fastener system of claim 1 wherein said anchor lock plate is further configured to permit said further rotation of said fastener in said first direction upon said interlocking engagement with said fastener first end.

4. The fastener system of claim 1 wherein said biasing element is further configured to bias said lock plate into contact engagement with said fastener first end upon said complete rotation of said fastener in said first direction and further bias said lock plate into said interlocking engagement with said fastener first end upon said contact engagement of said lock plate with said fastener first end and partial rotation of said fastener in said first direction or said second direction.

5. The fastener system of claim 4 wherein said lock plate is further configured to limit said partial rotation of said fastener to no more than one-quarter of one rotation in said first direction or said second direction upon contact engagement with said fastener first end.

6. The fastener system of claim 4 wherein:
   said fastener first end comprises a fastener engagement surface and a fastener locking feature disposed on said fastener engagement surface,
   said lock plate further comprises a lock plate engagement surface and a lock plate locking feature disposed on said lock plate engagement surface,
   said fastener locking feature aligns with said lock plate locking feature upon said further rotation of said fastener in said first direction or said second direction, and
   said lock plate locking feature mates with said fastener locking feature upon said interlocking engagement of said lock plate with said fastener first end.

7. The fastener system of claim 6 wherein:
said fastener locking feature comprises at least two fastener protrusions extending from said fastener engagement surface,
said lock plate locking feature comprises at least two lock plate recesses formed in said lock plate engagement surface,
said at least two lock plate recesses receive said at least two fastener protrusions upon alignment of said fastener locking feature and said lock plate locking feature, and
said lock plate is further configured to prohibit said rotation of said fastener in said first direction upon said at least two lock plate recesses receiving said at least two fastener protrusions.

8. The fastener system of claim 6 wherein:
said fastener locking feature comprises at least two fastener recesses formed in said fastener engagement surface,
said lock plate locking feature comprises at least two lock plate protrusions extending from said lock plate engagement surface,
said at least two lock plate protrusions enter said at least two fastener recesses upon alignment of said fastener locking feature and said lock plate locking feature, and
said lock plate is further configured to prohibit said rotation of said fastener in said first direction upon said at least two lock plate protrusions entering said at least two fastener recesses.

9. The fastener system of claim 6 wherein:
said fastener locking feature comprises at least two fastener teeth extending from said fastener engagement surface,
said lock plate locking feature comprises at least two lock plate pawls extending from said lock plate engagement surface,
said at least two fastener teeth catch against said at least two lock plate pawls upon alignment of said fastener locking feature and said lock plate locking feature, and
said lock plate is further configured to permit said rotation of said fastener in said first direction upon said at least two fastener teeth catching against said at least two lock plate pawls.

10. The fastener system of claim 1 wherein said fastener channel is configured to receive a pin to disengage said lock plate from said fastener first end.

11. The fastener system of claim 10 wherein:
said lock plate comprises a lock plate first end and a longitudinally opposed lock plate second end;
said anchor channel comprises a lock plate channel extending from said lock plate first end to said lock plate second end; and
with said fastener received by said anchor and engaged with said lock plate, said lock plate channel and said fastener channel are aligned and in fluid communication with each other to enable said flow of said cooling air to pass though said lock plate and said fastener.

12. The fastener system of claim 1 wherein at least one of the lock plate and the fastener is made of a ceramic composite.

13. A structure comprising:
a first structure member comprising a first fastener aperture;
a second structure member comprising a second fastener aperture, wherein said second structure member abuts said first structure member and said second fastener aperture is aligned with said first fastener aperture;
a nut plate comprising a nut plate receptacle, wherein said nut plate is coupled to said first structure member within said first fastener aperture and is rotationally fixed relative to said first structure member;
a nut comprising a nut recess, wherein said nut is located in said nut plate receptacle of said nut plate and is rotationally fixed relative to said nut plate;
a lock plate located in said nut recess of said nut, wherein said lock plate is longitudinally moveable within said nut recess and is rotationally fixed relative to said nut;
a biasing element connected to said lock plate; and
a fastener comprising a fastener first end, wherein said fastener is inserted through said second fastener aperture and said nut recess and is captured by said nut; and wherein:
said biasing element biases said lock plate into contact engagement with said fastener first end upon complete rotation of said fastener in a first direction and further biases said lock plate into interlocking engagement with said fastener first end upon said contact engagement of said lock plate with said fastener first end and further rotation of said fastener in said first direction or a second direction, opposite said first direction; and
said lock plate prohibits further rotation of said fastener in said second direction upon said interlocking engagement with said fastener first end.

14. The structure of claim 13 wherein said lock plate prohibits said further rotation of said fastener in said first direction upon said interlocking engagement with said fastener first end.

15. The structure of claim 13 wherein:
said first structure member further comprises a cooling air plenum in fluid communication with said first fastener aperture;
said nut plate further comprises a nut plate channel extending through said nut plate and in fluid communication with said cooling air plenum;
said lock plate comprises a lock plate channel extending through said lock plate and in fluid communication with said nut plate channel; and
said fastener further comprises a fastener channel extending through said fastener and in fluid communication with said lock plate channel.

16. The structure of claim 13 wherein at least one of the nut plate, the nut, the lock plate, and the fastener is made of a ceramic composite.

17. The fastener system of claim 13 wherein said lock plate is further configured to limit said further rotation of said fastener to no more than one-quarter of one rotation upon said contact engagement with said fastener first end.

18. A fastener system comprising:
an anchor assembly comprising:
a nut plate comprising a nut plate receptacle;
a nut comprising a nut recess, wherein said nut is located in said nut plate receptacle of said nut plate and is rotationally fixed relative to said nut plate;
a lock plate located in said nut recess of said nut, wherein said lock plate is longitudinally moveable within said nut recess and is rotationally fixed relative to said nut; and
a biasing element located between said lock plate and said nut plate; and
a fastener comprising a fastener first end; and wherein:
said nut is configured to receive and capture said fastener upon rotation of said fastener in a first direction;

said biasing element biases said lock plate into said nut recess and into engagement with said fastener first end upon complete rotation of said fastener in said first direction; and said lock plate prohibits further rotation of said fastener in a second direction, opposite said first direction, upon interlocking engagement with said fastener first end.

19. The fastener system of claim 18, wherein:

said nut plate further comprises a nut plate channel extending through said nut plate;

said lock plate comprises a lock plate channel extending through said lock plate;

said fastener further comprises a fastener channel extending through said fastener; and with said fastener received by said nut and engaged with said lock plate, said fastener channel, said lock plate channel, and said nut plate channel are aligned and in fluid communication with each other to enable a flow of a cooling airflow to pass through said anchor assembly and said fastener.

20. The fastener system of claim 18 wherein at least one of the nut, the lock plate, and the fastener is made of a ceramic composite.

\* \* \* \* \*